US008082653B2

(12) United States Patent  
Akimoto et al.

(10) Patent No.: US 8,082,653 B2
(45) Date of Patent: Dec. 27, 2011

(54) METHOD OF PRODUCING COIL MADE UP OF RECTANGULAR WAVE-SHAPED WINDINGS

(75) Inventors: Akito Akimoto, Kariya (JP); Keisuke Suga, Toyota (JP); Shinichi Ogawa, Oobu (JP)

(73) Assignee: Denso Corporation, Kariya (JP)

( * ) Notice: Subject to any disclaimer, the term of this patent is extended or adjusted under 35 U.S.C. 154(b) by 463 days.

(21) Appl. No.: 12/464,290

(22) Filed: May 12, 2009

(65) Prior Publication Data

US 2009/0276997 A1 Nov. 12, 2009

(30) Foreign Application Priority Data

May 12, 2008 (JP) .................. 2008-124936

(51) Int. Cl.
*H02K 15/04* (2006.01)
*H02K 15/02* (2006.01)

(52) U.S. Cl. ............. 29/596; 29/598; 29/605; 29/602.1; 310/201; 310/208

(58) Field of Classification Search ............ 29/735–736, 29/596–598, 33 F, 825, 602.1, 605; 310/201, 310/180, 184, 203, 206, 207
See application file for complete search history.

(56) References Cited

U.S. PATENT DOCUMENTS

| | | | |
|---|---|---|---|
| 5,936,326 A | 8/1999 | Umeda et al. | |
| 6,140,735 A * | 10/2000 | Kato et al. | 310/201 |
| 6,376,961 B2 * | 4/2002 | Murakami et al. | 310/184 |
| 6,501,205 B1 * | 12/2002 | Asao et al. | 310/184 |
| 6,707,211 B2 * | 3/2004 | Oohashi et al. | 310/179 |
| 6,760,965 B2 * | 7/2004 | Asao et al. | 29/596 |
| 6,865,796 B1 * | 3/2005 | Oohashi et al. | 29/596 |
| 7,365,467 B2 * | 4/2008 | Bramson et al. | 310/180 |
| 7,386,931 B2 * | 6/2008 | Neet et al. | 29/596 |
| 7,804,217 B2 * | 9/2010 | Hasegawa et al. | 310/179 |
| 7,812,498 B2 * | 10/2010 | Kouda | 310/201 |
| 7,948,143 B2 * | 5/2011 | Nakamura | 310/201 |
| 7,952,250 B2 * | 5/2011 | Hasegawa et al. | 310/179 |
| 8,008,830 B2 * | 8/2011 | Kouda et al. | 310/201 |
| 2001/0019234 A1 * | 9/2001 | Murakami et al. | 310/180 |
| 2002/0030417 A1 * | 3/2002 | Asao | 310/201 |
| 2002/0092152 A1 * | 7/2002 | Asao et al. | 29/596 |
| 2004/0207282 A1 | 10/2004 | Ueda et al. | |

(Continued)

FOREIGN PATENT DOCUMENTS

JP 11-285216 10/1999

(Continued)

*Primary Examiner* — Derris Banks
*Assistant Examiner* — Kaying Kue
(74) *Attorney, Agent, or Firm* — Nixon & Vanderhye PC

(57) ABSTRACT

A method of producing a coil which comprises steps of bending each of straight coil wires into a rectangular wave shape including in-slot portions to be disposed in slots of a stator core and turned portions connecting between the in-slot portions, turning a coil bend-forming portion that is one of the in-slot portions of each coil wire which becomes a folded bend of a phase winding by 180° around an axis thereof, twisting the turned portions of the coil wires together to weave the coil wires into a wire bundle, and folding the wire bundle at the coil bend-forming portions of the coil wires to place sides of the wire bundle to overlap each other to make the coil, thereby eliminating the 180° twisting of the coil bend-forming portions to produce the coil without any undesirable deformation of the phase windings.

6 Claims, 31 Drawing Sheets

U.S. PATENT DOCUMENTS

| | | |
|---|---|---|
| 2007/0180682 A1 | 8/2007 | Ueda et al. |
| 2008/0179983 A1* | 7/2008 | Hasegawa et al. ............ 310/179 |
| 2009/0260219 A1* | 10/2009 | Takada et al. .................. 29/596 |
| 2010/0077599 A1* | 4/2010 | Tokizawa ........................ 29/596 |
| 2010/0141078 A1* | 6/2010 | Kouda et al. .................. 310/195 |
| 2010/0187938 A1* | 7/2010 | Yamamoto et al. ........... 310/195 |
| 2010/0244615 A1* | 9/2010 | Kouda .......................... 310/215 |

FOREIGN PATENT DOCUMENTS

| | | |
|---|---|---|
| JP | 2003-018778 | 1/2003 |
| JP | 3982446 | 7/2007 |
| WO | WO 2008/108351 | 9/2008 |

* cited by examiner

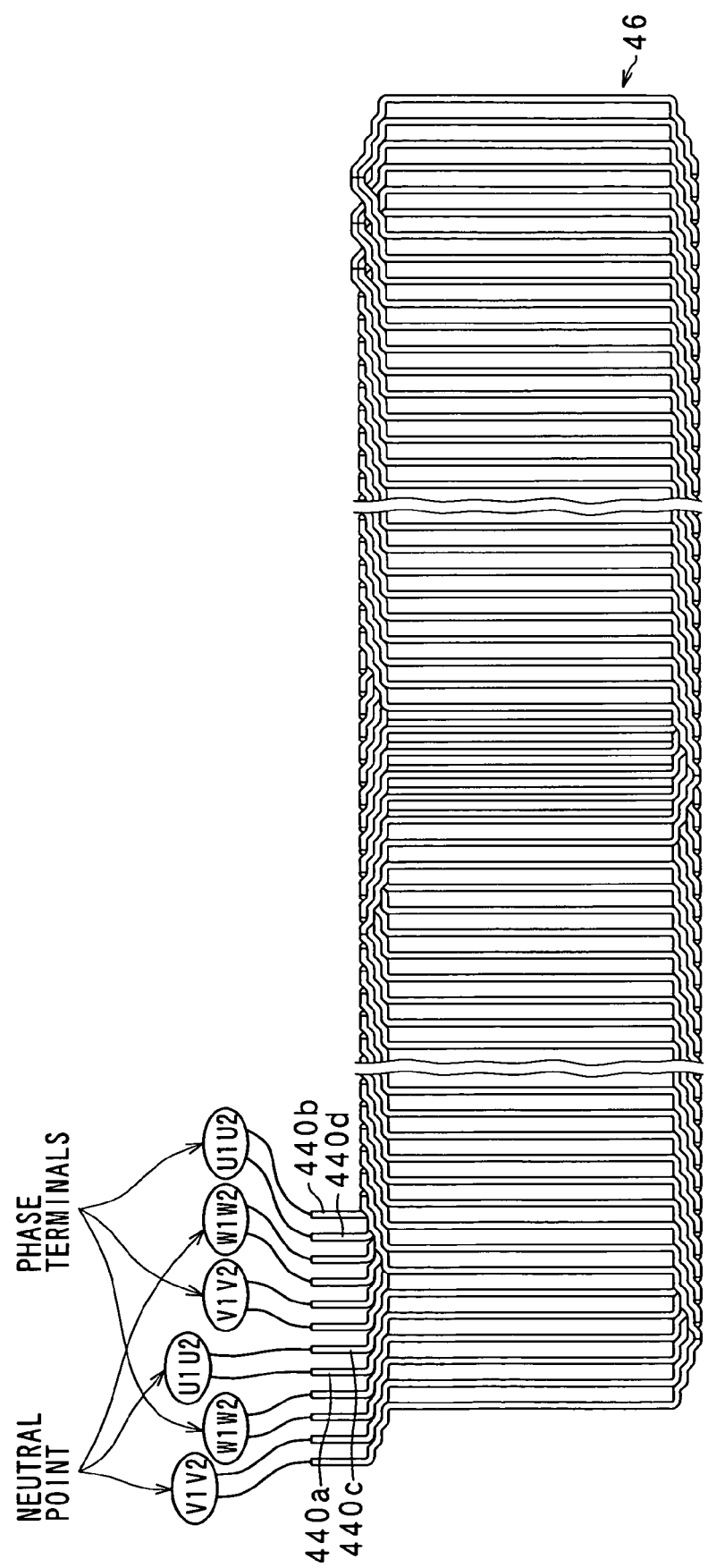

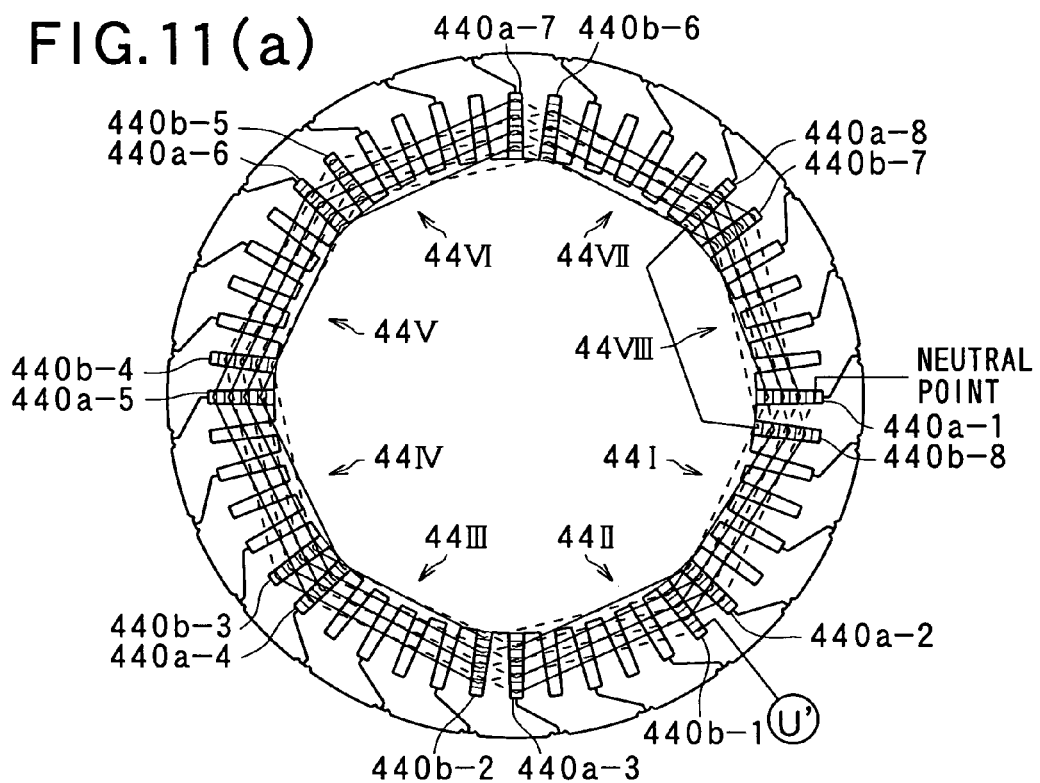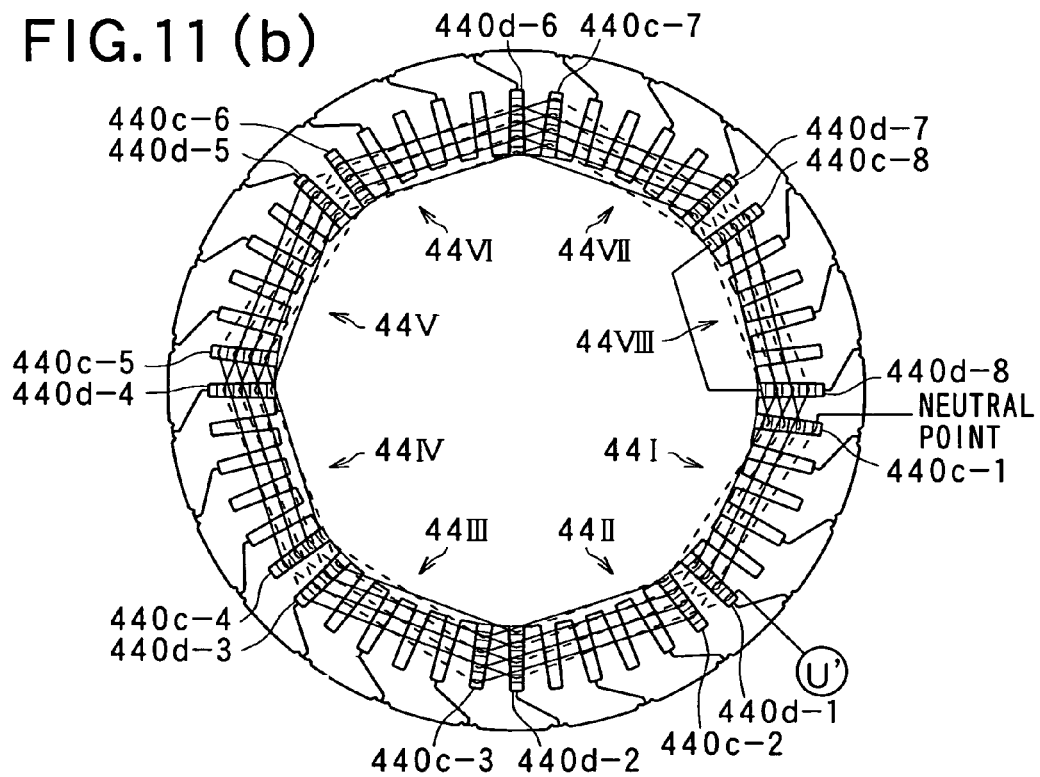

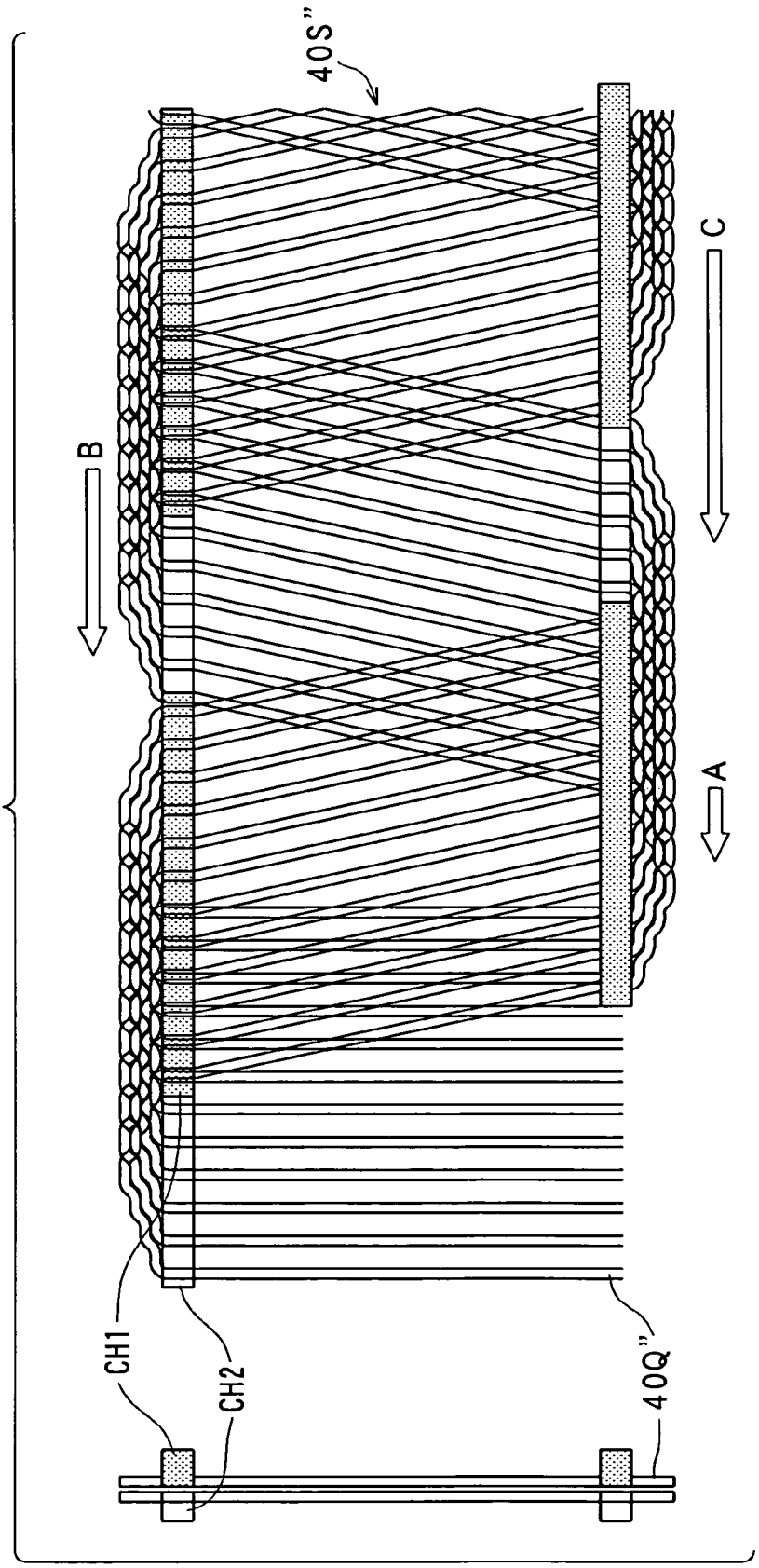

SPREAD ANGLE 0°

SPREAD ANGLE 25°

SPREAD ANGLE 60°

METHOD OF PRODUCING COIL MADE UP OF RECTANGULAR WAVE-SHAPED WINDINGS

CROSS REFERENCE TO RELATED DOCUMENT

The present application claims the benefit of Japanese Patent Application No. 2008-124936 filed on May 12, 2008, the disclosure of which is incorporated herein by reference.

BACKGROUND OF THE INVENTION

1. Technical Field of the Invention

The present invention relates generally to a method of producing a coil made up of rectangular wave-shaped windings for use in an electric rotary machine such as a motor-generator for automotive vehicles.

2. Background Art

Japanese Patent First Publication Nos. 11-285216 and 2003-18778 teach an electric rotary machine which may be employed an electric motor and/or an electric generator. The rotary machine is equipped with stator windings made up of U-shaped segment conductors which are disposed in slots formed in a stator core and have ends joined to each other electrically.

Each of the segment conductors of the electric rotary machine, as taught in the former publication, is twisted at the center (i.e., a bend) thereof to insert legs or tines thereof into two of the slots arrayed in a circumferential direction of the stator core, thus resulting in an increased height of portions (usually called coil ends) of the stator windings which protrude from the ends of the stator core. In other words, the coil ends protrude from the stator core undesirably.

In the electric rotary machine, as taught in the latter publication, the bend of each of the segment conductors is shaped in the form of a crank without being twisted in order to minimize the height of the coil ends.

In the case where the rotary machine of the former publication is designed to have the slots arrayed at a constant interval away from each other and the segment conductors of the same thickness, triangles each defined by the coil end of the segment conductor and the end of the stator will be identical in length of the base and base angle with each other. The rotary machine of such a type has, therefore, a limitation to decreasing the height of the coil ends.

The height of the coil ends may be decreased by making the coil with a single flat wire to eliminates joints of the segment conductors on the end of the stator core and shaping the coil ends to be stepwise in an axial direction of the stator core to have the height thereof which is a multiple of width of the flat wire.

If the coil is made of a single wire, as described above, the wire needs to be folded to mount the coil in the stator core, which may cause undesirable deformation of the coil. The folding of the wire also results in a difficulty in shaping the coil ends to be stepwise due to physical interference between adjacent segments of the folded wire.

SUMMARY OF THE INVENTION

It is therefore a principal object of the invention to provide a method of producing a coil for use in an electric rotary machine without undesirable deformation thereof.

According to one aspect of the invention, there is provided a method of producing a coil for use in an electric rotary machine. The coil is to be wound in a stator core in which a plurality of slots are arrayed in a circumferential direction of the stator core. The coil includes a plurality of phase-windings each of which is waved in the circumferential direction and has a length made up of in-slot portions, turned portions, and a coil bend defined by one of the in-slot portions. Each of the in-slot portions is to be disposed in one of the slots. Each of the turned portions connects between adjacent two of the in-slot portions outside the stator core. Each of the phase-windings is folded at the coil bend so as to reverse a direction in which the phase winding is wound in the stator core. The method comprises the steps of: (a) bending each of straight coil wires into a rectangular wave shape including the in-slot portions and the turned portions; (b) turning a coil bend-forming portion that is one of the in-slot portions of each of the coil wires which becomes the coil bend of the phase winding by 180° around an axis of the one of the in-slot portions; (c) twisting the turned portions of one of the coil wires and the turned portions of another of the coil wires together to weave the coil wires into a wire bundle; and (d) folding the wire bundle at the coil bend-forming portions of the coil wires to place sides of the wire bundle to overlap each other to make the coil.

Specifically, the folding of the wire bundle eliminates the 180° twisting of the coil bend-forming portions, thus permitting the coil to be formed without any undesirable deformation of the phase windings.

In the preferred mode of the invention, each of the coil wires has a length made up of a first portion, a second portion, and the coil bend-forming portion between the first and second portions. The bending step includes a first bending step to bend the first portion into the rectangular wave shape and a second bending step to bend the second portion into the rectangular shape. The turning step is performed between the first and second bending step.

The method may further comprise a stepwise coil end forming step which is performed before the folding step to form the turned portions into a stepwise shape.

According to another aspect of the invention, there is provided a method of producing a coil for use in an electric rotary machine. The coil is to be wound in a stator core in which a plurality of slots are arrayed in a circumferential direction of the stator core. The coil includes a plurality of phase-windings each of which is waved in the circumferential direction and has a length made up of in-slot portions, turned portions, and a coil bend defined by one of the in-slot portions. Each of the in-slot portions is to be disposed in one of the slots. Each of the turned portions connects between adjacent two of the in-slot portions outside the stator core. Each of the phase-windings is folded at the coil bend so as to reverse a direction in which the phase winding is wound in the stator core. The method comprising the steps of: (a) bending each of straight coil wires into a rectangular wave shape except end portions of a coil bend-forming portion, the rectangular wave shape including the in-slot portions and the turned portions, one of the in-slot portions being a coil bend-forming portion which becomes the coil bend of one of the phase windings; (b) weaving the coil wires, as produced by the bending step, together into a wire bundle; and (c) folding the wire bundle at the ends of the coil bend-forming portion of each of the coil wires at right angles toward an adjacent one of the in-slot portions. This places sides of the wire bundle to overlap each other to make the coil without any undesirable deformation of the phase windings.

In the preferred mode of the invention, the method may further comprise a bend forming step of forming bends at ends of each of the in-slot portions of each of the coil wire so as to spread adjacent two of the in-slot portions with increasing distance from one of the turned portions between the adjacent two. The weaving step is to intersect an end of a first coil wire that is one of the coil wires with an end of a second coil wire that is another of the coil wires, hold other ends of the first coil and the second coil at an angle which an axis of the first coil wire makes with an axis of the second coil wire and which is within a given ranges and to rotate at least one of the first and second coil wires to twist the turned portions of the first and second coil wires together to make the wire bundle. The method further comprise a contracting step of straightening the bends of the in-slot portions of the coil wires of the wire bundle to contract the wire bundle so as to move adjacent two of the in-slot portions close to each other.

The method may further comprise a stepwise coil end forming step which is performed before the folding step to form the turned portions into a stepwise shape.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 10 is a view which shows a winding assembly of the coil installed in the rotary machine of FIG. 1;

FIG. 11(a) is a plane view which shows connections of a U-phase winding of the coil installed in the rotary machine of FIG. 1;

FIG. 11(b) is a plane view which shows connections of a U-phase winding of the coil Installed in the rotary machine of FIG. 1;

FIG. 35 is a view which shows an operation of a contracting step that is one of the steps in FIG. 30;

DESCRIPTION OF THE PREFERRED EMBODIMENTS

Figure 1:
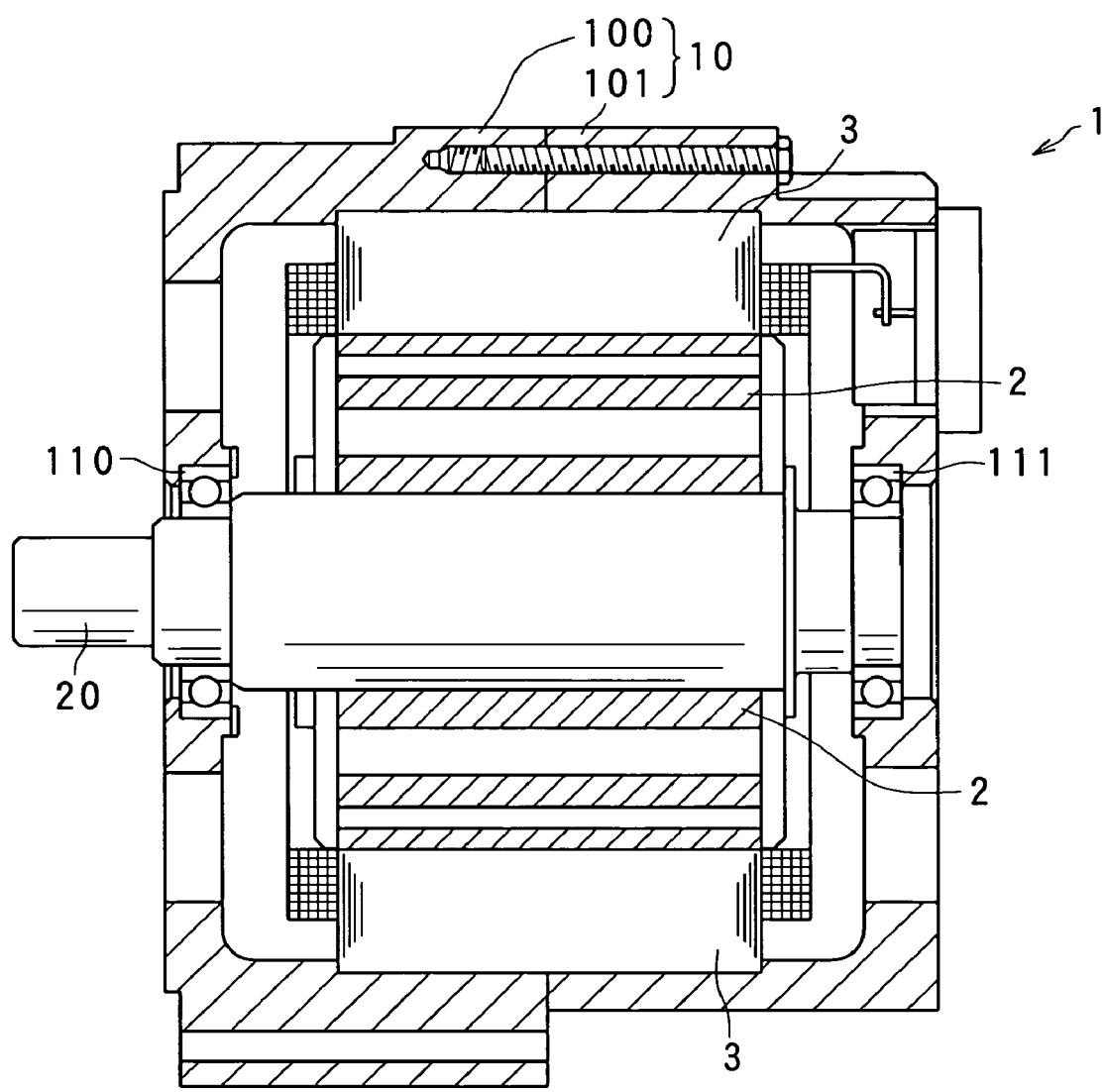
FIG. 1 is a longitudinal sectional view which shows an internal structure of an electric rotary machine equipped with a coil according to the invention.

Referring to the drawings, wherein like reference numbers refer to like parts in several views, particularly to FIG. 1, there is shown an electric rotary machine 1 according to the present invention which may be employed as a motor-generator for automotive vehicles.

The rotary machine 1 includes a hollow housing 10, a rotor 2, and a stator 3. The housing 10 is made up of a front cup 100 and a rear cup 101 which are joined at openings thereof together. The housing 10 has installed therein bearings 110 and 111 through which a rotary shaft 20 is retained to be rotatable. The rotor 2 is fit on the rotary shaft 20. The stator 3 is disposed inside the housing 10 and surrounds the periphery of the rotor 2.

The rotor 2 has a plurality of permanent magnets arrayed on an outer circumference thereof facing an inner circumference of the stator 3. The permanent magnets are so oriented as to have S-poles and N-poles arrayed alternately in the circumferential direction of the rotor 2. The number of the poles depends upon the type of the rotary machine 1. In this embodiment, the rotor 2 has four S-poles and four N-poles. A total number of the poles is eight (8).

Figure 2:
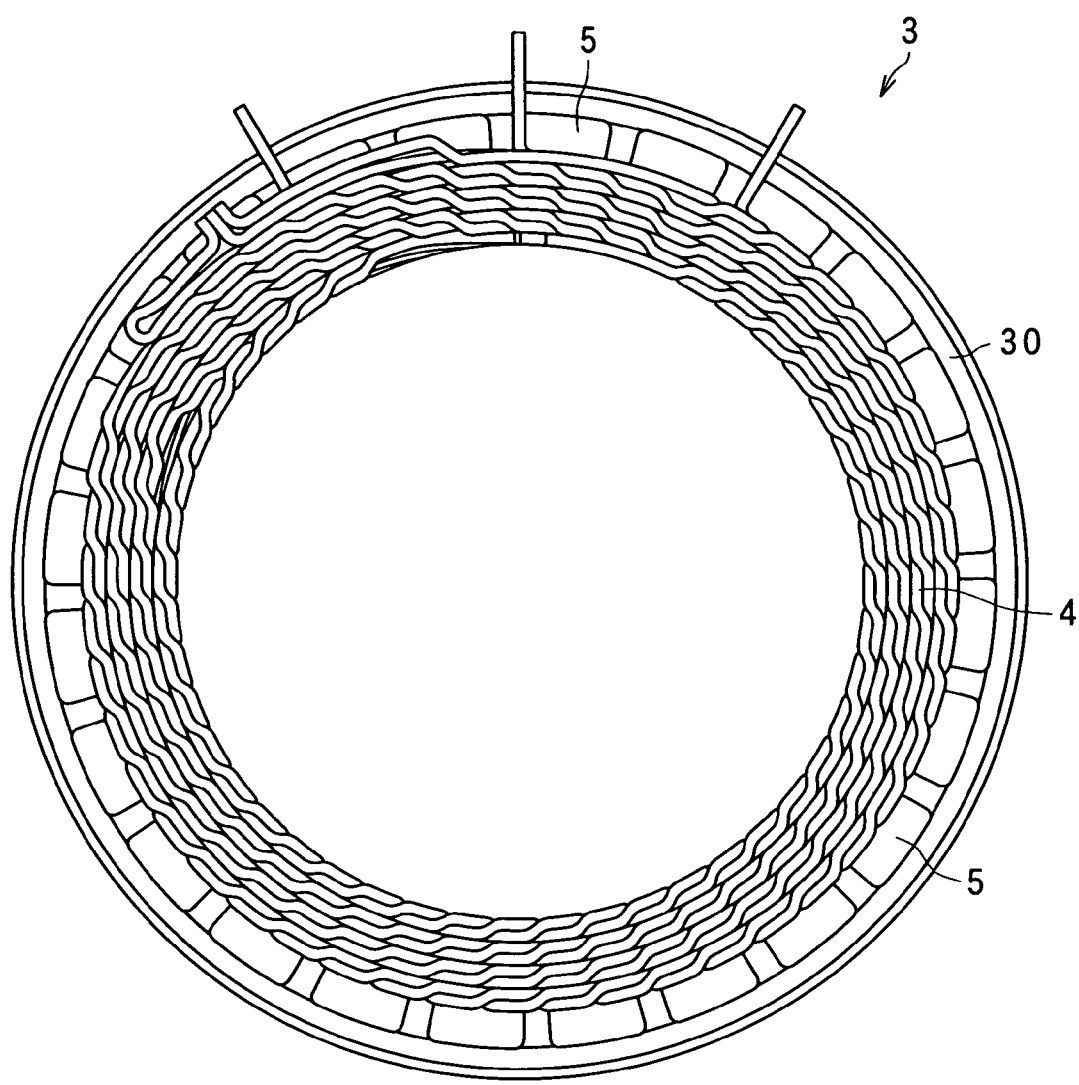
FIG. 2 is a plane view which shows a stator installed in the electric rotary machine of FIG. 1.

The stator 3 is, as illustrated in FIG. 2, equipped with a stator core 30, a three-phase coil 4 made up of a plurality of phase-windings, and electrical insulating paper 5 disposed between the stator core 30 and the coil 4.

Figure 3:
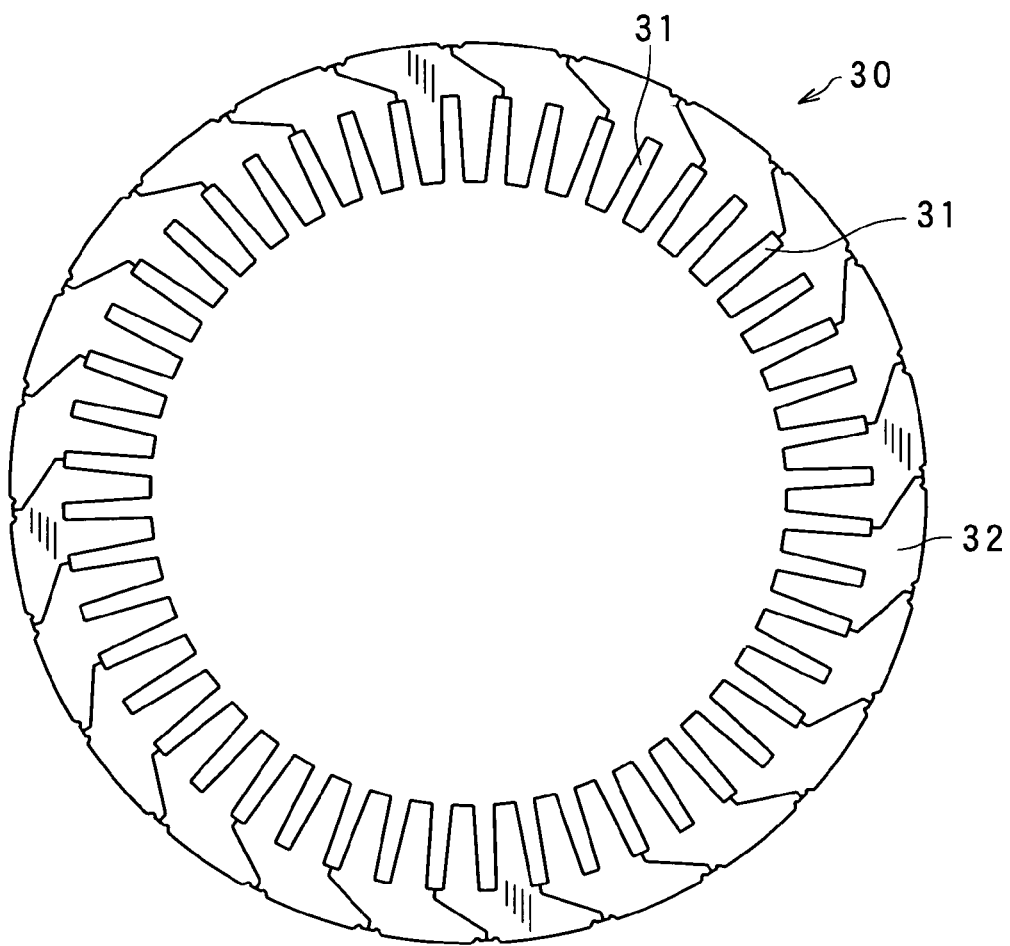
FIG. 3 is a plane view which shows a structure of a stator core of the stator in FIG. 2.

The stator core 30 is, as illustrated in FIG. 3, of an annular shape and has a plurality of slots 31 formed in an inner circumference thereof. The slots 31 are oriented radially of the stator core 30. In other words, each of the slots 31 has a depth extending toward the center of the stator core 30. The slots 31 are provided two for each of the three phases of the coil 4 for each pole of the stator 2. Specifically, a total number of the slots 31 is fort eight (48)=8×3×2.

Figure 4:
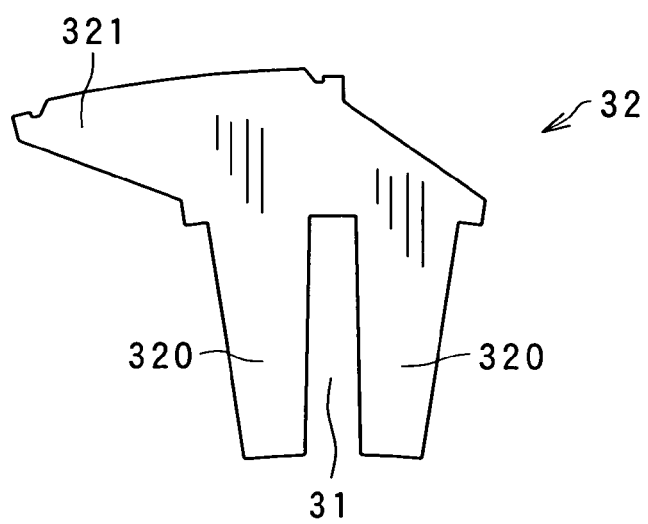
FIG. 4 is a plane view which shows a core piece that is a part of the stator core of FIG. 3.

The stator core 30 is, as illustrated in FIG. 4, an assembly of twenty four (24) core pieces 32 arrayed in a circle. Each of the core pieces 32 has one of the slots 31 and is so shaped as to define two of the slots 31 along with left and right adjacent ones of the core pieces 32. Specifically, each of the core pieces 32 is made up of two teeth 320 extending in the radius direction of the stator core 30 and a back core base 321 connecting between the teeth 320.

Each of the core pieces 32 is made of a stack of 410 flat rolled magnetic steel sheets of 0.3 mm thickness. An insulating sheet is interposed between adjacent two of the magnetic steel sheets. The stator core 30 may alternatively be made of a stack of typically known metal sheets and insulating films.

Figure 5A:
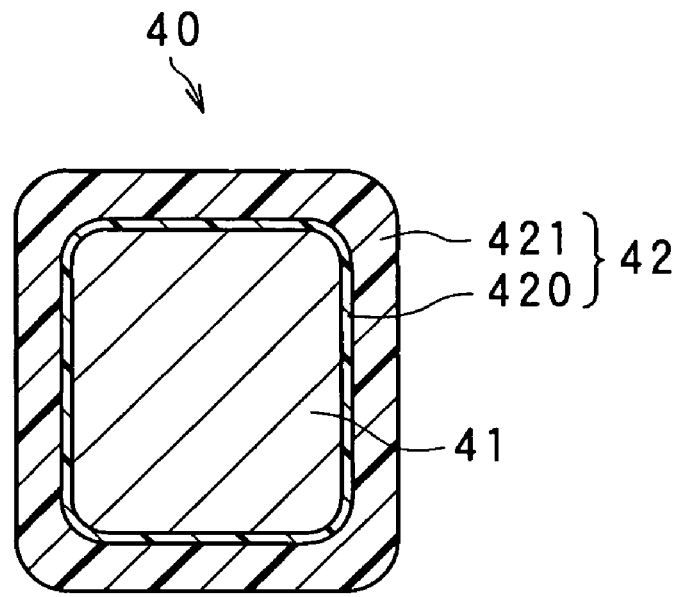
FIG. 5(a) is a traverse sectional view which shows a winding of the coil installed in the rotary machine of FIG. 1.

The coil 4 is formed by winding a plurality of wires 40 in a given manner. The wires or windings 40 are, as illustrated in FIG. 5(a), each made of a copper conductor 41 and an insulating film 42 wrapped about the conductor 41. The insulating film 42 includes an inner layer 420 and outer layer 421. A total thickness of the insulating film 42 (including thicknesses of the inner and outer layers 420 and 421) is 100 μm to 200 μm. Such a great thickness of the insulating film 42 eliminates the need for insulating the windings 40 electrically from each other, but insulating sheet 5, as illustrated in FIG. 2, may be interposed between the windings 40.

Figure 5B:
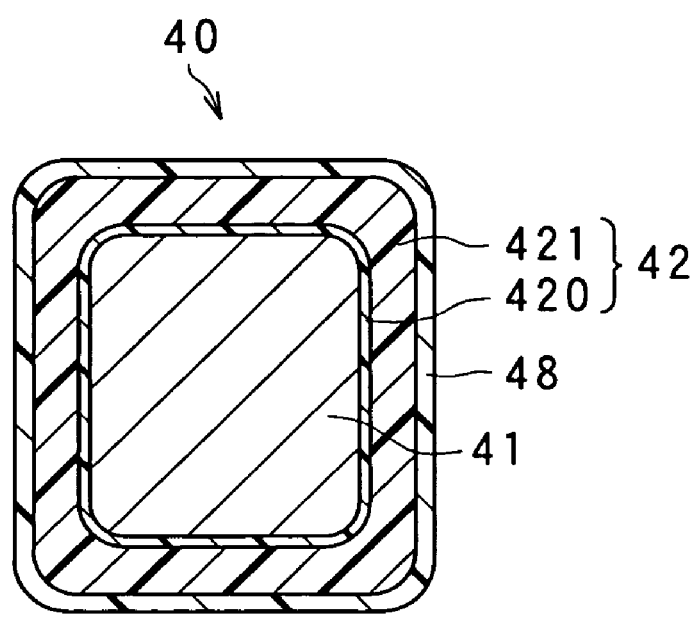
FIG. 5(b) is a traverse sectional view which shows a modification of the winding of FIG. 5(a)

The windings 40 of the coil 4, as illustrated in FIG. 5(b), may also have a fusible bonding material 48 such as epoxy resin with which the insulating film 42 is covered. When subjected to heat generated in the rotary machine 1, the fusible bonding material 48 usually melts at an earlier time than the insulating film 42, thereby causing the windings 40 in each of the slots 31 to be bonded thermally to each other through the fusible bonding material 48. The windings 40 in each of the slots 31 are, therefore, substantially changed into a one-piece steel winding, thus resulting in an increase in mechanical strength of the windings 40 in the slots 31.

Figure 6:
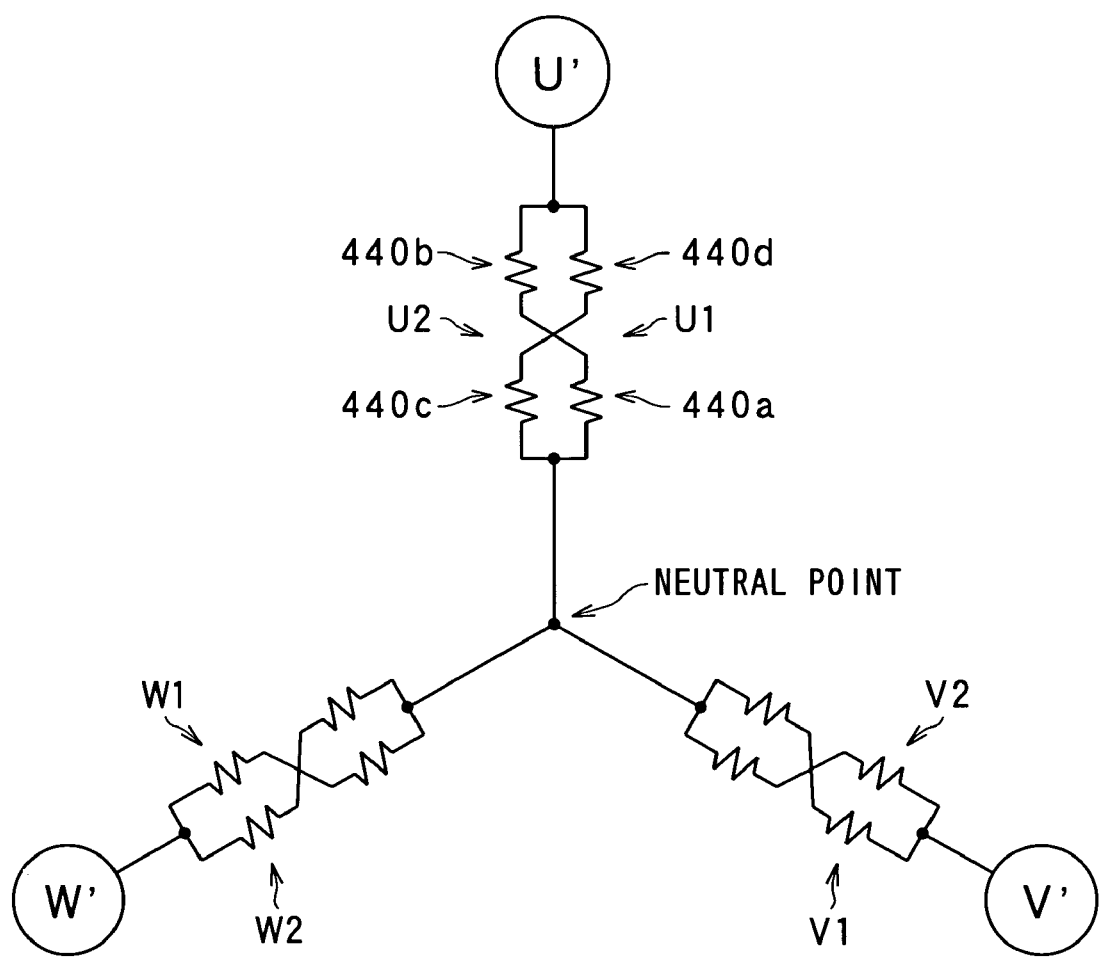
FIG. 6 is a circuit diagram which shows connections of windings of the coil installed in the rotary machine of FIG. 1.

The coil 4, as illustrated in FIG. 6, consists of two sets of three-phase windings. Specifically, a winding 440a of a U1-phase is joined in series with a winding 440b of a U2-phase. A winding 440c of the U2-phase is joined in series with a winding 440d of the U1-phase. The windings 440a and 440b are joined in parallel to the windings 440c and 440d to make a U-phase winding. A V-phase winding and a W-phase winding are made, as can be seen from FIG. 6, in the same manner as the U-phase winding.

Figure 7:
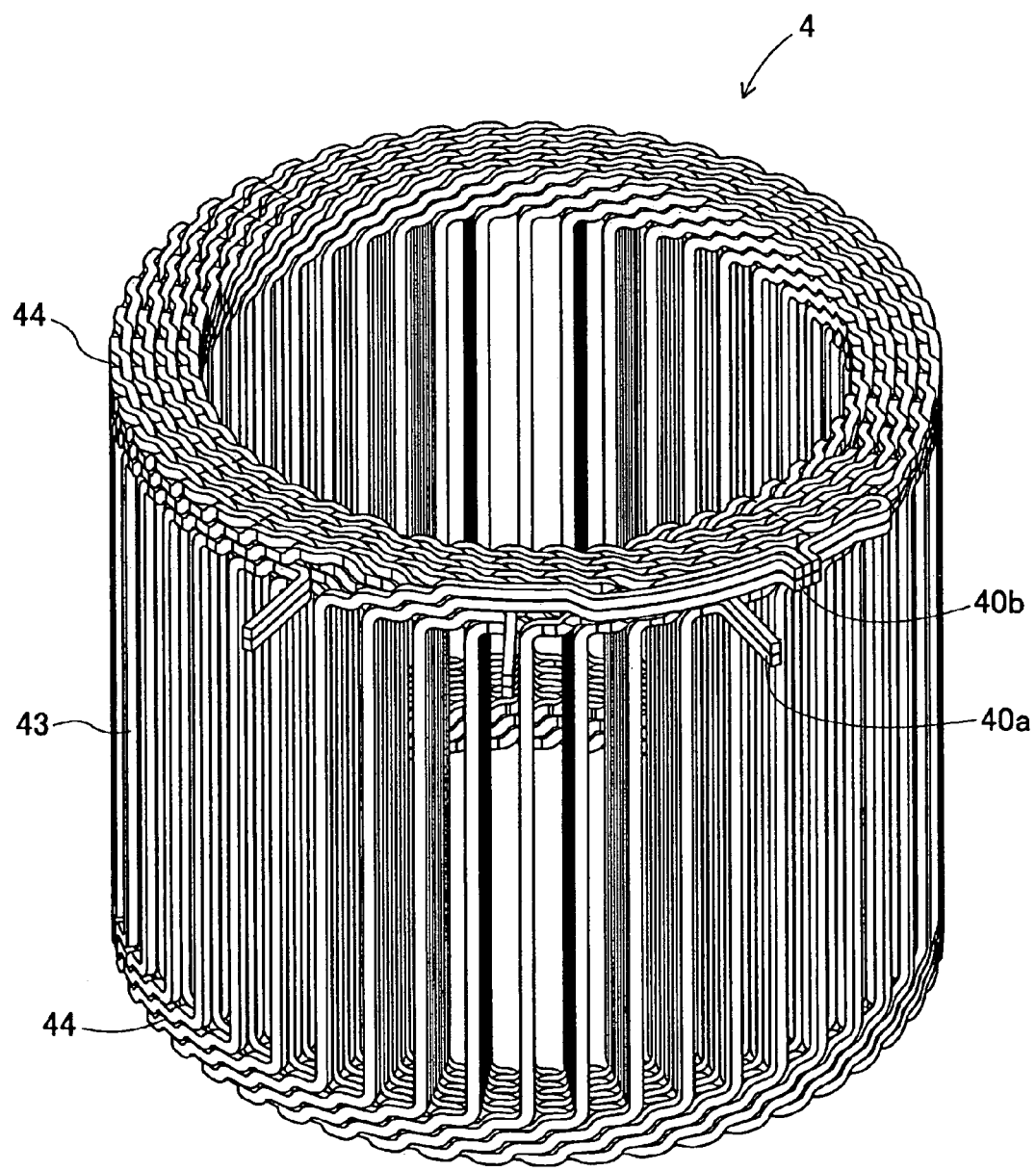
FIG. 7 is a perspective view which shows the coil installed in the rotary machine of FIG. 1.

The coil 4 is, as illustrated in FIG. 7, constructed by the windings 40 wound together in a predetermined shape. The windings 40 are wave-wound through an inside circumference of the stator core 30. Each of the windings 40 has straight in-slot portions 43 disposed in the slots 30 and turned portions 44 each of which connects two of the in-slot portions 43. The in-slot portions 43 of each of the windings 40 are accommodated in every predetermined number of the slots 31 (every 3 phases×2=6 slots 31 in this embodiment). The turned portions 44 project from the axial ends of the stator core 30.

Figure 12:
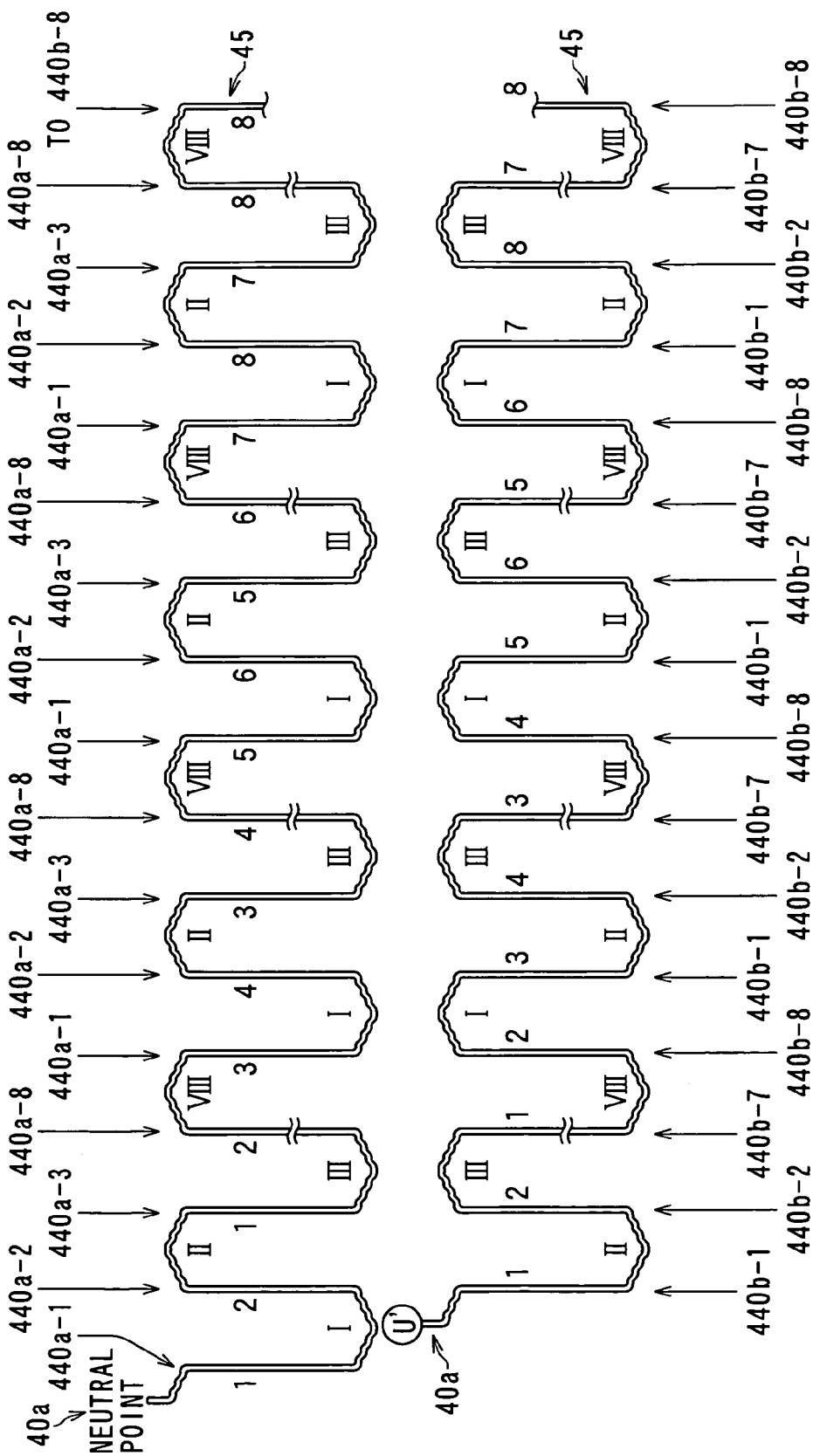
FIG. 12 is a development view which shows locations of portions of a U-phase winding to be disposed in slots of a stator core.

Each of the windings 40 of the coil 4 is wave-wound in the circumferential direction with one end thereof projecting from the axial end of the stator core 30 as an output and the other end thereof projecting from the axial end of the stator core 30 as the neutral point. As can bee seen from FIG. 6, the U-phase winding of the coil 4 is made up of the winding 440a of the U1-phase and the winding 440b of the U2-phase which are joined integrally at ends thereof, as denoted at 46a in FIG. 28, and the winding 440c of the U2-phase and the winding 440d of the U1-phase which are joined integrally at ends thereof, as denoted at 46a in FIG. 28. The windings 440a and 440d have the in-slot portions 43 disposed in the same slots 31. The windings 440b and 440c have the in-slot portions 43 disposed in the other same slots 31. The in-slot portions 43 of the winding 440a and the in-slot portions 43 of the winding 440d are laid to overlap each other alternately in a depth-wise direction of the slots 31. Similarly, the in-slot portions 43 of the winding 440b and the in-slot portions 43 of the winding 440c are laid to overlap each other alternately in the depth-wise direction of the slots 31. The windings 440a and 440b are joined, as illustrated in FIG. 12, at ends 45 (which will also be referred to a joint 45 below). The joint 45 defines, as illustrated in FIG. 10, the in-slot portion 43 that is a coil bend 46 of the winding 40.

As illustrated in FIG. 6, the windings 440a and 440b are joined together to form one of the windings 40. The windings 440c and 440d are joined together to form another of the windings 40. These two windings 40 form a winding pair and are connected in parallel to each other to define each of the three-phase windings. The coil 4 is so designed as to have the six winding pairs which form two sets (i.e., double sets of the slots 31) of the three phase windings (i.e., the U-, V-, and W-phase windings). Specifically, the coil 4 is made up of the two windings 40a and 40b (see FIG. 12)×three phases (U-, V-, and W-phases)×two (i.e., double sets of the slots 31)=a total of twelve windings 40. FIG. 12 illustrates the windings 40a and 40b of the U-phase.

Each of the winding pairs of the coil 4 makes four turns in the circumferential direction thereof. Specifically, the winding pair is shaped in the form of four layers laid to overlap each other in the radial direction of the coil 4. In other words, the eight in-slot portions 43 (i.e., the four layers×the two windings 40) are disposed in each of the slots 31. The ends of the winding pair lie at the outermost layer, while the joint of the winding pair (i.e., the joint of the windings 40) lies at the innermost layer.

The turned portions 44 lie on the ends of the stator core 30. The middle of the turned portion 44 is substantially shaped in the form of a crank without twisting. The amount of misalignment of the turned portion 44 in the radial direction of the stator core 30 which arises from the formation of the crank is within the width of the winding 40, thereby enabling the turned portions 44 of the windings 40 to be wound tightly without physical interference between the turned portions 44 arrayed in the radial direction of the stator core 30. This results in a decrease in radial width of the coil ends projecting from the ends of the stator core 30, thus avoiding the overhanging of the windings 40 in the radial direction of the stator core 30.

Each of the turned portions 44 extends outside one of the ends of the stator core 30 stepwise in the axial direction of the stator core 30. Specifically, each of the windings 40 has stepwise coil ends to eliminate the physical interference with the windings 40 extending from adjacent ones of the slots 31. This also eliminates the need for increasing the height or width of each of the coil ends in the axial or radial direction of the stator core 30 in order to avoid the interference between the adjacent coil ends thereby permitting the size of the coil ends to be decreased.

Each of the stepwise turned portions 44 has four steps. The height of each of the steps, that is, the distance between adjacent two of the steps is designed to be substantially identical with the width of the windings 40, thereby permitting the turned portions 44 to be arrayed tightly without unwanted clearances therebetween in the axial direction of the stator core 30.

The outermost one of the steps of the turned portion 44 which is most distant from the end of the stator core 30 has the above described crank-like portion. The turned portion 44 is shaped stepwise to be symmetrical on either side of the outermost step.

The ends of the winding pairs made up of, as described above, the windings 40 protrude in the radial direction of the stator core within a height range of the coil ends of the coil 4 (i.e., the turned portions 44 projecting outside the ends of the stator core 30). The ends of the winding pairs on the neutral point of the coil 4 lie at a higher position than the other ends of the winding pairs in the stator core 30.

The above structure of the coil 4 is also described in Japanese Patent Application No. 2008-110789 filed on Apr. 21, 2008 and International Publication No. WO 2008/108351 A, the disclosure of which is incorporated herein by reference.

The wound state of the windings 40 of the coil 4 will be described below in detail with reference to FIGS. 8 to 13.

Figure 8:
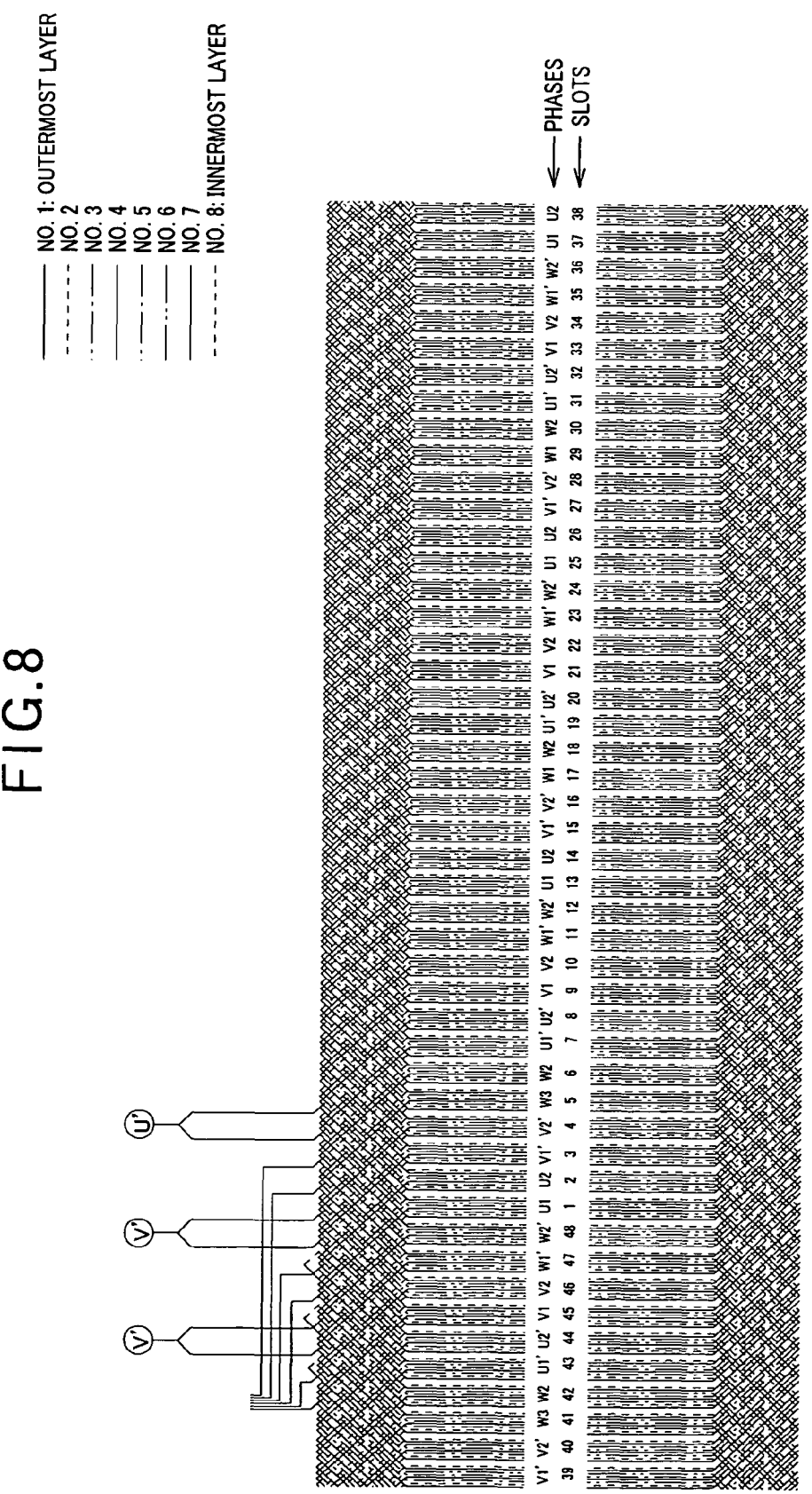
FIG. 8 is a development view which shows connections of windings of the coil installed in the rotary machine of FIG. 1.
Figure 9:
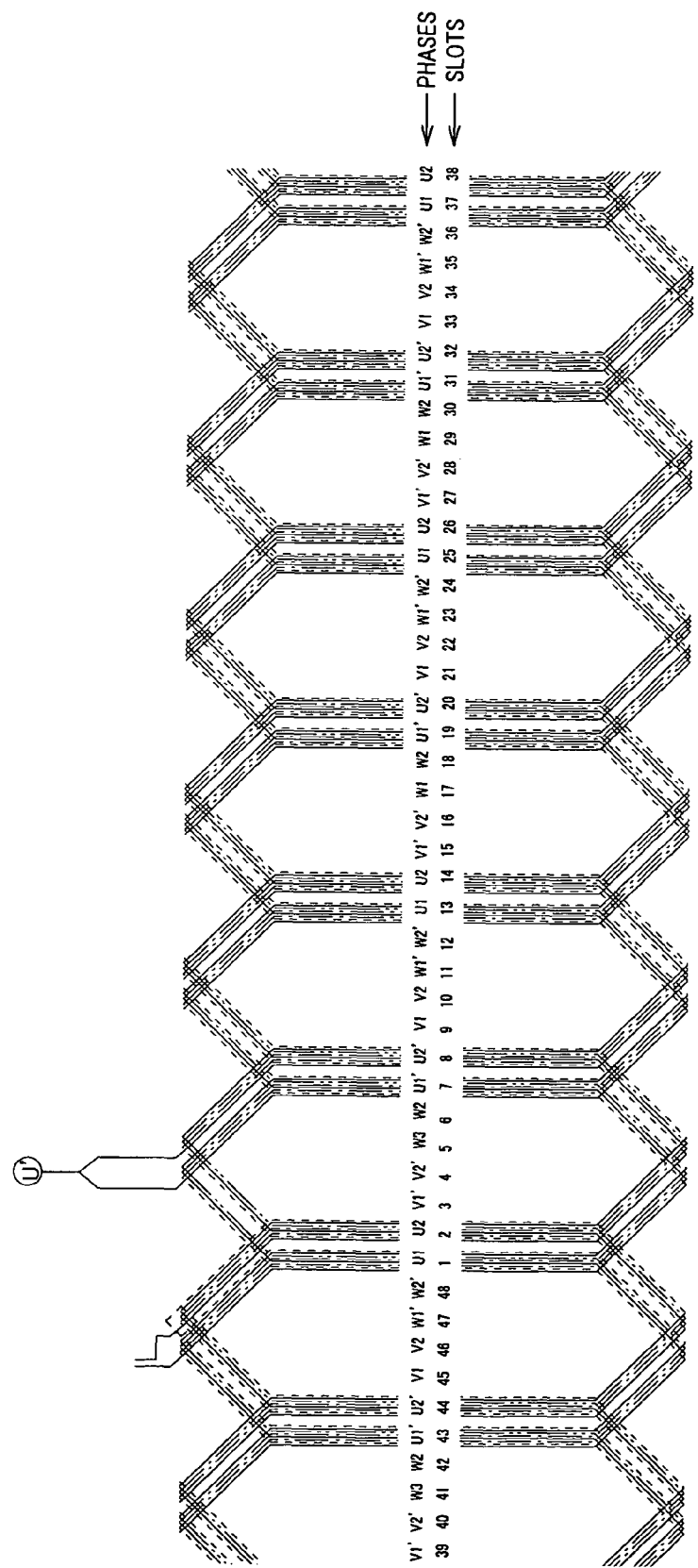
FIG. 9 is a development view which shows only a U-phase winding of the coil installed in the rotary machine of FIG. 1.

The coil 4 is, as described above, made up of two sets of three-phase windings (i.e., the U1-, U2-, V1-, V2-, W1-, and W2-phase windings). FIG. 8 illustrates how to connect the three-phase windings. The slot number 1 indicates one of the slots 31 in which one of the in-slot portions which is closest to one of the ends of the U1-phase winding on the side of the neutral point is disposed. The slot numbers 2, 3, 4, . . . indicates the slots 31 arrayed in the circumferential direction of the stator core 30 in which the windings are wound. FIG. 9 demonstrates only the windings 40 forming the U-phase winding (i.e., the U1- and U2-phase windings), as illustrated in FIG. 8, for the sake of ease of visibility. In FIGS. 8 to 9, lines extending straight vertically indicate the in-slot portions 43. Lines extending obliquely upward or downward indicate the turned portions 44.

FIG. 10 is a development view of the coil 4. The joint of the ends of the windings 440*a* and 440*c* is the neutral point. The joint of the ends of the windings 440*b* and 440*d* is a phase terminal. The coil 4 is formed by using the six winding pairs each of which is made up of two pairs of the windings 40*a* and 40*b*. The six winding pairs define the tree-phase windings (i.e., the U1-, U2-, V1-, V2-, W1-, and W2-phase windings) of the coil 4. The windings 40*a* and 40*b* may be formed by a piece of copper wire in which the ends of the windings 440*a* and 440*b* (or 440*c* and 440*d*) which are opposite the neutral point and the phase terminal are joined integrally. Alternatively, the windings 40*a* and 40*b* may also be formed by welding the ends of the windings 440*a* and 440*b* (or 440*c* and 440*d*) together which are opposite the neutral point and the phase terminal.

Figure 13:
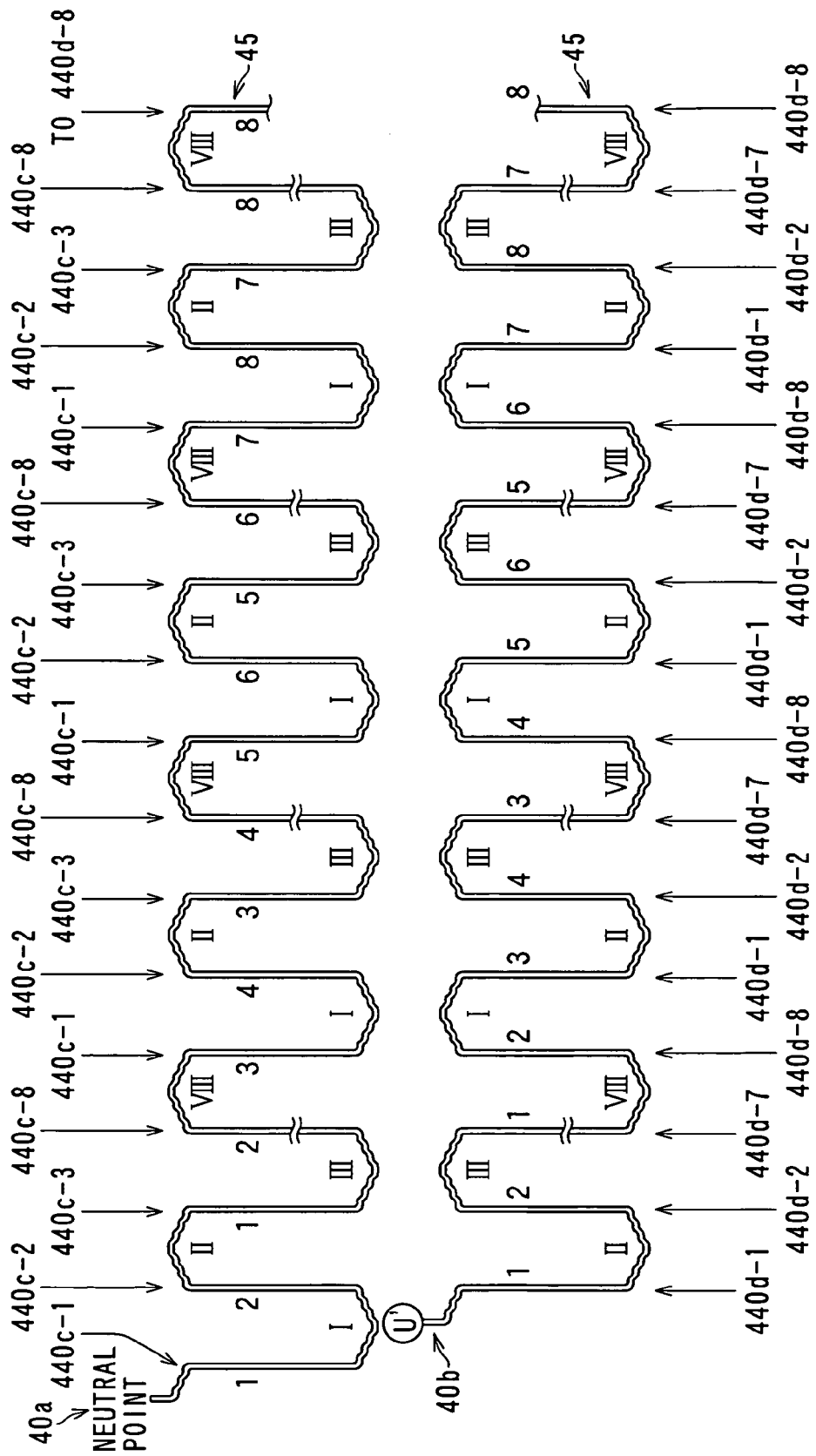
FIG. 13 is a development view which shows locations of portions of a U-phase winding to be disposed in slots of a stator core.

The U-phase, V-phase, and W-phase windings are made in the same manner. For the brevity of disclosure, how to wind or make the windings 40 of the coil 4 will be described below with reference to the U-phase winding. FIGS. 11(*a*) and 11(*b*) illustrate the layout of the windings 40 of the U-phase. Specifically, FIG. 11(*a*) illustrates the windings 440*a* and 440*b*. FIG. 11(*b*) illustrates the windings 440*c* and 440*d*. FIG. 12 illustrates positional relations between the windings 440*a* and 440*b* and between the turned portions 44 thereof in the depthwise direction of the slots 31. Similarly, FIG. 13 illustrates positional relations between the windings 440*c* and 440*d* and between the turned portions 44 thereof in the depthwise direction of the slots 31.

The connection between the windings 440*a* and 440*b* of the U-phase will be described below with reference to FIGS. 11(*a*) and 12. The stator 2 has eight poles. The slots 31 in which the windings 40 (i.e., the windings 440*a* and 440*b*) of the U-phase are illustrated as sixteen (16) slots 440*a*-1, 440*a*-2, . . . 440*a*-8, 440*b*-1, 440*b*-2, . . . , and 440*b*-8. In the following discussion, the in-slot portions 43 disposed in the slots 440*a*-1 to 440*b*-8 will also be referred to as windings 440*a*-1 to 440*b*-8 below for the sake of convenience. The eight (S) in-slot portions 43 are laid to overlap each other in the depthwise direction within the slot 31. Numeral 8 indicates the innermost location within the slot 31 where the in-slot portion 43 is disposed closest to an opening of the slot 31. Numerals 7, 6, . . . , and 1 indicate locations of the in-slot portions 43 lying outwardly respectively.

The windings 440*a* and 440*b* areas as described above, joined at ends thereof in series. The end of the winding 440*a*-1 is connected to the neutral point. The end of the winding 440*b*-1 is joined to the winding 440*d*, as illustrated in FIG. 13, to make a connection with the U-phase terminal.

The winding 440*a* has the in-slot portion 43 which is disposed at the first location in the slot 440*a*-1 and is closest to the neutral position. The winding 440*b* has the in-slot portion 43 which is disposed at the first location in the slot 440*b*-1 and is closest to the end of the winding 440*b*.

The in-slot portion 43 of the winding 440*a* lying adjacent the one disposed in the slot 440*a*-1 extends from the turned portion 44I that is one of the turned portion 44 lying on the end of the stator core 30 (will also be referred to as a lower end below) which is opposite the end of the stator core 30 (will also be referred to an upper end below) from which the end of the winding 440*a* protrudes and connects with the neutral point and enters the second location in the slot 440*a*-2. In other words, the turned portion 44I connects between the in-slot portion 43 at the first location in the slot 440*a*-1 and the in-slot portion 43 at the second location in the slot 440*a*-2 on the lower end of the stator core 30.

The in-slot portion 43 of the winding 440*a* lying adjacent the one disposed in the slot 440*a*-2 extends from the turned portion 44II that is one of the turned portion 44 lying on the upper end of the stator core 30 and enters the first location in the slot 440*a*-3. In other words, the turned portion 44II connects between the in-slot portion 43 at the second location in the slot 440*a*-2 and the in-slot portion 43 at the first location in the slot 440*a*-3 on the upper end of the stator core 30. The in-slot portion 43 of the winding 440*a* lying adjacent the one disposed in the slot 440*a*-3 extends from the turned portion 44III that is one of the turned portion 44 lying on the lower end of the stator core 30 and enters the second location in the slot 440a-4.

As stated above, the turned portions 44III connects between the in-slot portion 43 at the first location in the slot 440a-3 and the in-slot portion 43 at the second location in the slot 440a-4 on the lower end of the stator core 30.

The in-slot portion 43 of the winding 440b lying adjacent the one disposed in the slot 440b-1 extends from the turned portion 44II that is one of the turned portion 44 lying on lower end of the stator core 30 and enters the second location in the slot 440b-2. In other words, the turned portion 44II connects between the in-slot portion 43 at the first location in the slot 440b-1 and the in-slot portion 43 at the second location in the slot 440b-2 on the lower end of the stator core 30.

The in-slot portion 43 of the winding 440b lying adjacent the one disposed in the slot 440b-2 extends from the turned portion 44III that is one of the turned portion 44 lying on the upper end of the stator core 30 and enters the first location in the slot 440b-3. In other words, the turned portion 44III connects between the in-slot portion 43 at the second location in the slot 440b-2 and the in-slot portion 43 at the first location in the slot 440b-3 on the upper end of the stator core 30.

The in-slot portion 43 of the winding 440b lying adjacent the one disposed in the slot 440b-3 extends from the turned portion 44IV that is one of the turned portion 44 lying on the lower end of the stator core 30 and enters the second location in the slot 440b-4. In other words, the turned portions 44IV connects between the in-slot portion 43 at the first location in the slot 440b-3 and the in-slot portion 43 at the second location in the slot 440b-4 on the lower end of the stator core 30.

As apparent from the above, the windings 440a and 440b are so wound that the turned portions 44II to 44VII lying on the upper end of the stator core 30 connect between the adjacent in-slot portions 43 at the second and first locations, while the turned portions 44I to 44VIII lying on the lower end of the stator core 30 connect between the adjacent in-slot portions 43 at the first and second locations. In this manner, the winding 440a extends from the slot 440a-1 to the slot 440a-8 along the circumference of the stator core 30. Similarly, the winding 440b extends from the slot 440b-i to the slot 440b-8 along the circumference of the stator core 30. In the slots 440a-8 and 440b-8, the in-slot portions 43 of the winding 440a lie at the second locations.

The in-slot portions 43 of the windings 440a and 440b next to the ones at the second locations in the slots 440a-8 and 440b-8 are disposed at the third locations in the slots 440a-1 and 440b-1, respectively. In other words, the turned portions 44VIII and 44I on the upper end of the stator core 30 connect between the in-slot portions 43 at the second locations in the slots 440a-8 and 440b-8 and the in-slot portions 43 at the third locations in the slots 440a-1 and 440b-1 on the upper end of the stator core 30. Specifically, after being wound one time around the circumference of the stator core 30, the winding pair is shifted to a subsequent radially inside one of the locations in the slots 31.

The in-slot portion 43 of the winding 440a lying adjacent the one at the third location of the slot 440a-1 extends from the turned portion 44I on the lower end of the stator core 30 and enters the fourth location in the slot 440a-2. In other words, the turned portions 44I connects between the in-slot portion 43 at the third location in the slot 440a-1 and the in-slot portion 43 at the fourth location in the slot 440a-2 on the lower end of the stator core 30.

The in-slot portion 43 of the winding 440a lying adjacent the one in the slot 440a-2 extends from the turned portion 44II on the upper end of the stator core 30 and enters the third location in the slot 440a-3. In other words, the turned portions 44II connects between the in-slot portion 43 at the fourth location in the slot 440a-2 and the in-slot portion 43 at the third location in the slot 440a-3 on the upper end of the stator core 30.

The in-slot portion 43 of the winding 440a lying adjacent the one in the slot 440a-3 extends from the turned portion 44III on the lower end of the stator core 30 and enters the fourth location in the slot 440a-4. In other words, the turned portions 44III connects between the in-slot portion 43 at the third location in the slot 440a-3 and the in-slot portion 43 at the fourth location in the slot 440a-4 on the lower end of the stator core 30.

The in-slot portion 43 of the winding 440b lying adjacent the one at the third location of the slot 440b-1 extends from the turned portion 44II on the lower end of the stator core 30 and enters the fourth location in the slot 440b-2. In other words, the turned portions 44II connects between the in-slot portion 43 at the third location in the slot 440b-1 and the in-slot portion 43 at the fourth location in the slot 440b-2 on the lower end of the stator core 30.

The in-slot portion 43 of the winding 440b lying adjacent the one in the slot 440b-2 extends from the turned portion 44III on the upper end of the stator core 30 and enters the third location in the slot 440b-3. In other words, the turned portions 44III connects between the in-slot portion 43 at the fourth location in the slot 440b-2 and the in-slot portion 43 at the third location in the slot 440b-3 on the upper end of the stator core 30.

The in-slot portion 43 of the winding 440b lying adjacent the one in the slot 440b-3 extends from the turned portion 44IV on the lower end of the stator core 30 and enters the fourth location in the slot 440b-4. In other words, the turned portions 44IV connects between the in-slot portion 43 at the third location in the slot 440b-3 and the in-slot portion 43 at the second location in the slot 440b-4 on the lower end of the stator core 30.

As apparent from the above, the windings 440a and 440b are so wound that the turned portions 44II to 44VII lying on the upper end of the stator core 30 connect between the adjacent in-slot portions 43 at the third and fourth locations, while the turned portions 44I to 44VIII lying on the lower end of the stator core 30 connect between the adjacent in-slot portions 43 at the third and fourth locations. In this manner, the winding 440a extends from the slot 440a-1 to the sot 440a-8 along the circumference of the stator core 30. Similarly, the winding 440b extends from the slot 440b-1 to the slot 440b-8 along the circumference of the stator core 30. In the slots 440a-8 and 440b-8, the in-slot portions 43 of the winding 440a lie at the fourth locations.

The in-slot portions 43 of the windings 440a and 440b next to the ones at the fourth locations in the slots 440a-8 and 440b-8 are disposed at the fifth locations in the slots 440a-1 and 440b-1, respectively. In other words, the turned portions 44VIII and 44I on the upper end of the stator core 30 connect between the in-slot portions 43 at the fourth locations in the slots 440a-8 and 440b-8 and the in-slot portions 43 at the fifth locations in the slots 440a-1 and 440b-1 on the upper end of the stator core 30. Specifically, after being wound one time around the circumference of the stator core 30, the winding pair is shifted to a subsequent radially inside one of the locations in the slots 31.

The in-slot portion 43 of the winding 440a lying adjacent the one at the Fifth location of the slot 440a-1 extends from the turned portion 44I on the lower end of the stator core 30 and enters the Six location in the slot 440a-2. In other words, the turned portions 44I connects between the in-slot portion 43 at the fifth location in the slot 440a-1 and the in-slot portion 43 at the sixth location in the slot 440a-2 on the lower end of the stator core 30.

The in-slot portion 43 of the winding 440a lying adjacent the one in the slot 440a-2 extends from the turned portion 44II on the upper end of the stator core 30 and enters the fifth location in the slot 440a-3. In other words, the turned portions 44II connects between the in-slot portion 43 at the sixth location in the slot 440a-2 and the in-slot portion 43 at the fifth location in the slot 440a-3 on the upper end of the stator core 30.

The in-slot portion 43 of the winding 440a lying adjacent the one in the slot 440a-3 extends from the turned portion 44III on the lower end of the stator core 30 and enters the sixth location in the slot 440a-4. In other words, the turned portions 44III connects between the in-slot portion 43 at the fifth location in the slot 440a-3 and the in-slot portion 43 at the sixth location in the slot 440a-4 on the lower end of the stator core 30.

The in-slot portion 43 of the winding 440b lying adjacent the one at the fifth location of the slot 440b-1 extends from the turned portion 44II on the lower end of the stator core 30 and enters the sixth location in the slot 440b-2. In other words, the turned portions 44II connects between the in-slot portion 43 at the fifth location in the slot 440b-1 and the in-slot portion 43 at the sixth location in the slot 440b-2 on the lower end of the stator core 30.

The in-slot portion 43 of the winding 440b lying adjacent the one in the slot 440b-2 extends from the turned portion 44III on the upper end of the stator core 30 and enters the fifth location in the slot 440b-3. In other words, the turned portions 44III connects between the in-slot portion 43 at the sixth location in the slot 440b-2 and the in-slot portion 43 at the fifth location in the slot 440b-3 on the upper end of the stator core 30.

The in-slot portion 43 of the winding 440b lying adjacent the one in the slot 440b-3 extends from the turned portion 44IV on the lower end of the stator core 30 and enters the sixth location in the slot 440b-4. In other words, the turned portions 44IV connects between the in-slot portion 43 at the fifth location in the slot 440b-3 and the in-slot portion 43 at the sixth location in the slot 440b-4 on the lower end of the stator core 30.

As apparent from the above, the windings 440a and 440b are so wound that the turned portions 44II to 44VII lying on the upper end of the stator core 30 connect between the adjacent in-slot portions 43 at the fifth and sixth locations, while the turned portions 44I to 44VIII lying on the lower end of the stator core 30 connect between the adjacent in-slot portions 43 at the fifth and sixth locations. In this manner, the winding 440a extends from the slot 440a-1 to the slot 440a-8 along the circumference of the stator core 30. Similarly, the winding 440b extends from the slot 440b-1 to the slot 440b-8 along the circumference of the stator core 30. In the slots 440a-8 and 440b-8, the in-slot portions 43 of the winding 440a lie at the sixth locations.

The in-slot portions 43 of the windings 440a and 440b next to the ones at the sixth locations in the slots 440a-8 and 440b-8 are disposed at the seventh locations in the slots 440a-1 and 440b-1, respectively. In other words, the turned portions 44VIII and 44I on the upper end of the stator core 30 connect between the in-slot portions 43 at the sixth locations in the slots 440a-8 and 440b-8 and the in-slot portions 43 at the seventh locations in the slots 440a-1 and 440b-1 on the upper end of the stator core 30. Specifically, after being wound one time around the circumference of the stator core 30, the winding pair is shifted to a subsequent radially inside one of the locations in the slots 31.

The in-slot portion 43 of the winding 440a lying adjacent the one at the seventh location of the slot 440a-1 extends from the turned portion 44I on the lower end of the stator core 30 and enters the eighth location in the slot 440a-2. In other words, the turned portions 44I connects between the in-slot portion 43 at the seventh location in the slot 440a-1 and the in-slot portion 43 at the eighth location in the slot 440a-2 on the lower end of the stator core 30.

The in-slot portion 43 of the winding 440a lying adjacent the one in the slot 440a-2 extends from the turned portion 44II on the upper end of the stator core 30 and enters the seventh location in the slot 440a-3. In other words, the turned portions 44II connects between the in-slot portion 43 at the eighth location in the slot 440a-2 and the in-slot portion 43 at the seventh location in the slot 440a-3 on the upper end of the stator core 30.

The in-slot portion 43 of the winding 440a lying adjacent the one in the slot 440a-3 extends from the turned portion 44III on the lower end of the stator core 30 and enters the eighth location in the slot 440a-4. In other words, the turned portions 44III connects between the in-slot portion 43 at the seventh location in the slot 440a-3 and the in-slot portion 43 at the eighth location in the slot 440a-4 on the lower end of the stator core 30.

The in-slot portion 43 of the winding 440b lying adjacent the is one at the seventh location of the slot 440b-1 extends from the turned portion 44II on the lower end of the stator core 30 and enters the eighth location in the slot 440b-2. In other words, the turned portions 44II connects between the in-slot portion 43 at the seventh location in the slot 440b-1 and the in-slot portion 43 at the eighth location in the slot 440b-2 on the lower end of the stator core 30.

The in-slot portion 43 of the winding 440b lying adjacent the one in the slot 440b-2 extends from the turned portion 44III on the upper end of the stator core 30 and enters the seventh location in the slot 440b-3. In other words, the turned portions 44III connects between the in-slot portion 43 at the eighth location in the slot 440b-2 and the in-slot portion 43 at the seventh location in the slot 440b-3 on the upper end of the stator core 30.

The in-slot portion 43 of the winding 440b lying adjacent the one in the slot 440b-3 extends from the turned portion 44IV on the lower end of the stator core 30 and enters the eighth location in the slot 440b-4. In other words, the turned portions 44IV connects between the in-slot portion 43 at the seventh location in the slot 440b-3 and the in-slot portion 43 at the eighth location in the slot 440b-4 on the lower end of the stator core 30.

As apparent from the above, the windings 440a and 440b are so wound that the turned portions 44II to 44VII lying on the upper end of the stator core 30 connect between the adjacent in-slot portions 43 at the seventh and eighth locations, while the turned portions 44I to 44VIII lying on the lower end of the stator core 30 connect between the adjacent in-slot portions 43 at the seventh and eighth locations. In this manner, the winding 440a extends from the slot 440a-1 to the slot 440a-8 along the circumference of the stator core 30. Similarly, the winding 440b extends from the slot 440b-1 to the slot 440b-8 along the circumference of the stator core 30. In the slots 440a-8 and 440b-8, the in-slot portions 43 of the winding 440a lie at the eighth locations.

The in-slot portions 43 disposed in the slots 440a-8 and 440b-8 are joined to form the coil bend 46. In the manner, as described above, the winding pair made up of the windings 40a and 40b are wound around the stator core 30.

The windings 440c and 440d are wound in the manner illustrated in FIGS. 11(b) and 13 which is substantially the same as that of the windings 440a and 440b, and explanation thereof in detail will be omitted here.

The coil 4 is, as described above, made up of the six winding pairs to make the U1-, U2-, V1-, V2-, W1, and W2-phase windings. The V1-, V2-, W1-, and W2-phase windings are identical in structure with those of the U1- and U2-phase windings, and explanation thereof in detail will be omitted here.

Figure 14:
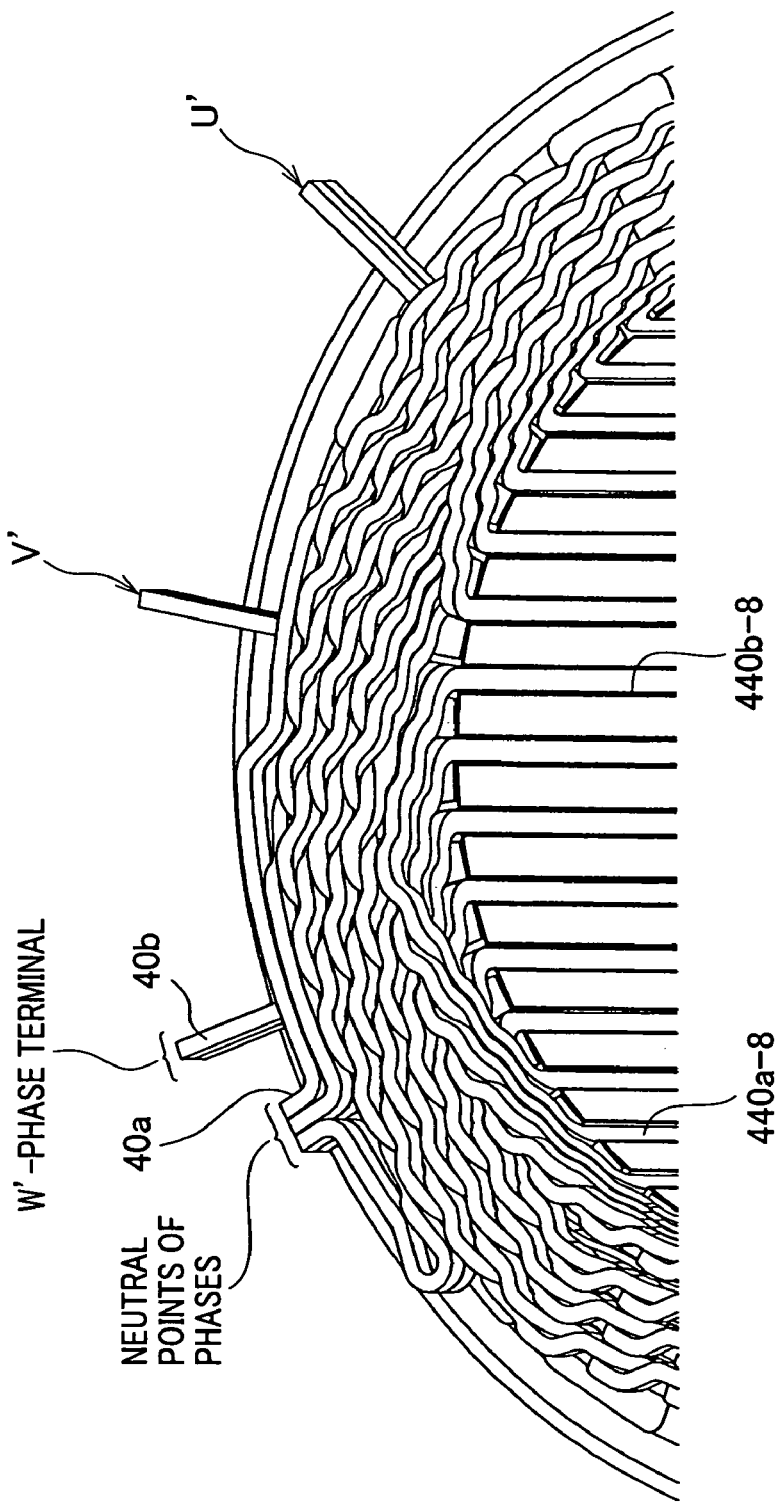
FIG. 14 is an enlarged partial perspective view which shows turned portions of windings which extend outside a stator of the coil installed in the rotary machine of FIG. 1.
Figure 15:
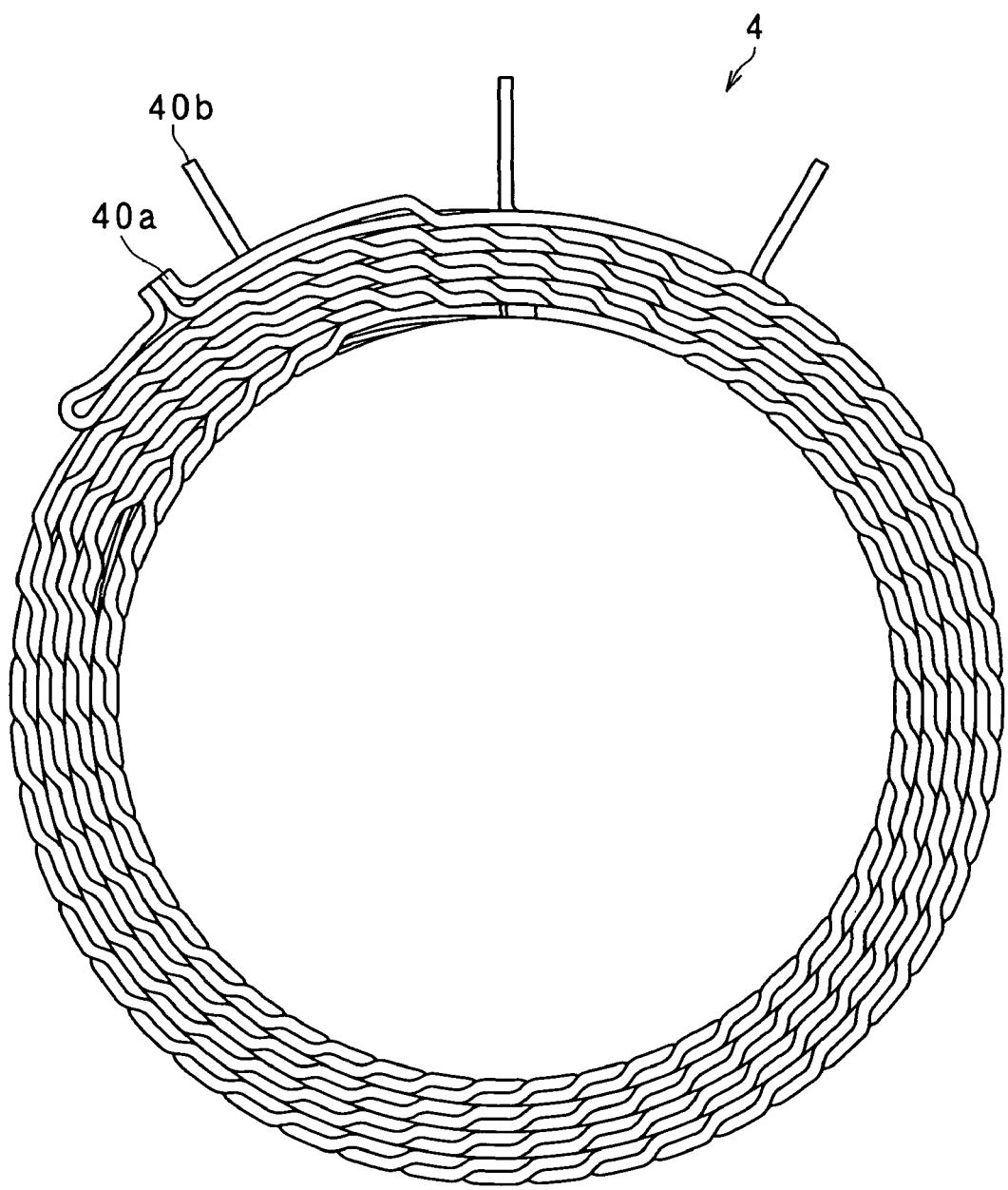
FIG. 15 is a top view of the coil installed in the rotary machine of FIG. 1.

The turned portions 44VIII of the fourth layer, as illustrated in FIGS. 14 and 15, connect between the slot 440a-8 and the slot 440b-8 on the upper end of the stator core 30. The turned portions VIII of the other layers which are located at the same level as those of the fourth layer in the circumferential direction of the stator core 30 are so shaped as to be shifted outwardly radially of the stator core 30, thereby eliminating the physical interference of the turned portions VIII of the fourth layer connecting between the slots 440a-8 and 440b-8 with the other turned portions VIII, which minimizes the size of the coil ends of the stator core 30 and also eliminates, as can be seen in FIG. 15, the need for the windings 40 to protrude from the inner circumference of the coil 4 facing the stator 2.

Figure 16:
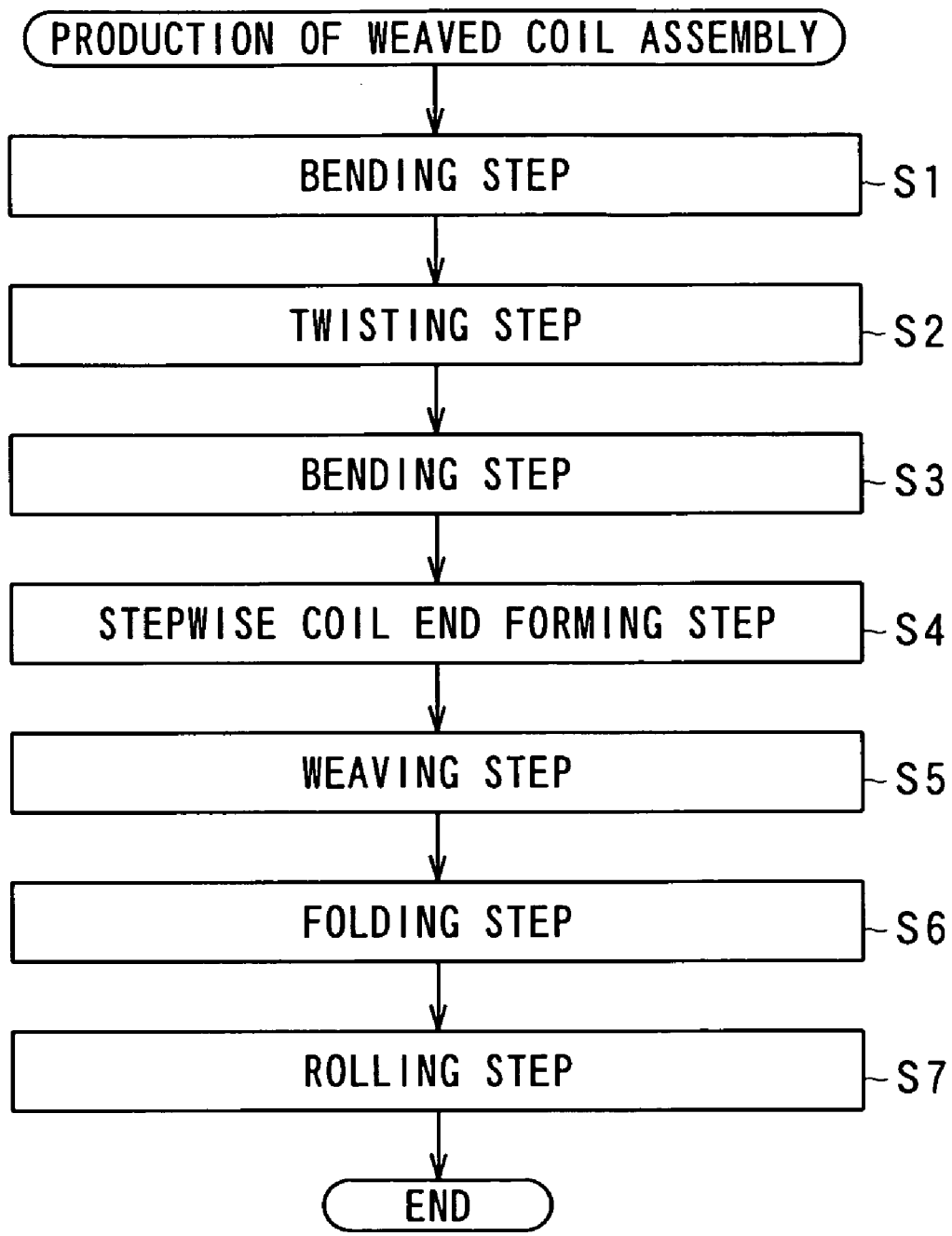
FIG. 16 is a flowchart which illustrates a sequence of steps of producing a coil according to the first embodiment of the invention.

A method of producing the coil 4 in the first embodiment will be described below with reference to FIGS. 16 to 23. FIG. 16 is a flowchart of a sequence of steps to make the coil 4.

Figure 17:
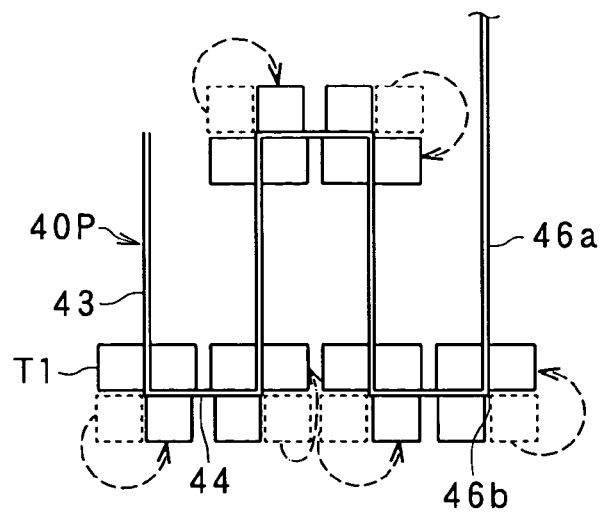
FIG. 17 is a view which illustrates an operation of a first bending step that is one of the steps in FIG. 16.
Figure 18:
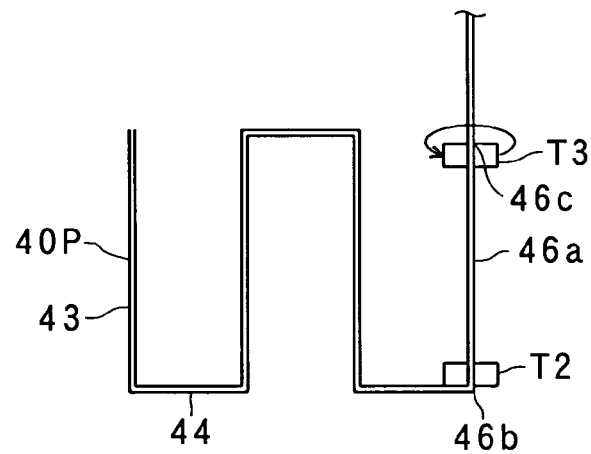
FIG. 18 is a view which illustrates an operation of a twisting step that is one of the steps in FIG. 16.
Figure 19:
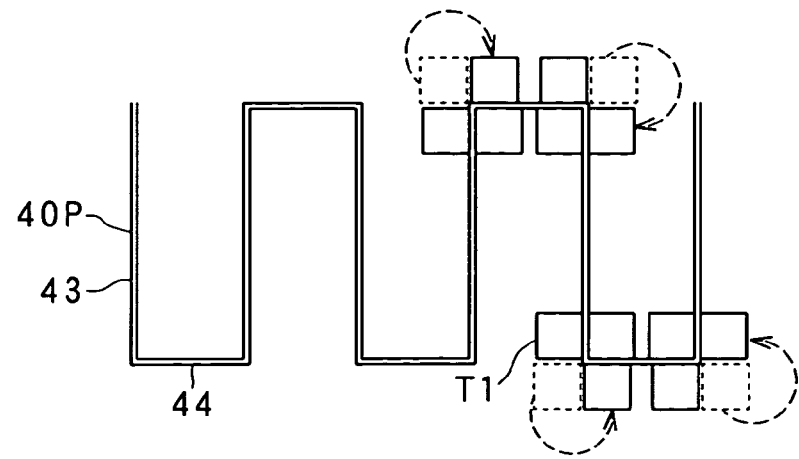
FIG. 19 is a view which illustrates an operation of a second bending step that is one of the steps in FIG. 16.
Figure 20:
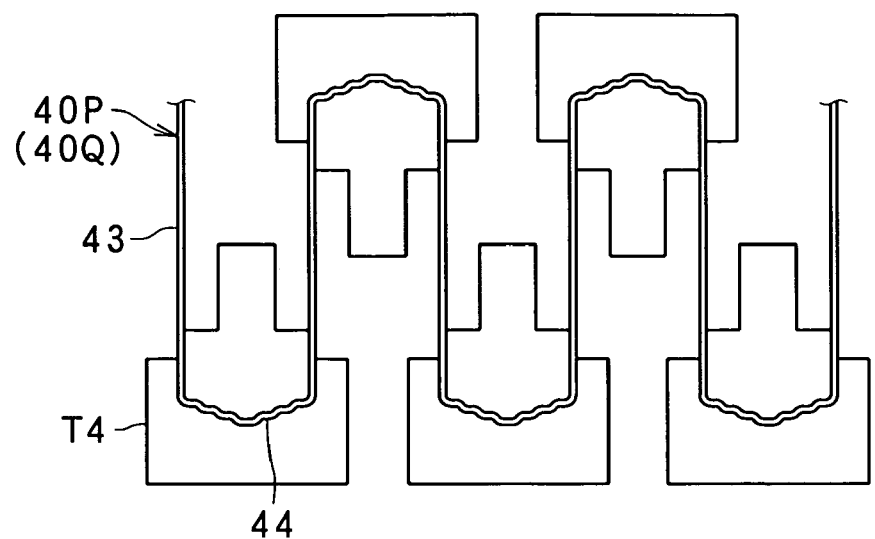
FIG. 20 is a view which illustrates an operation of a stepwise coil end forming step that is one of the steps in FIG. 16.
Figure 21:
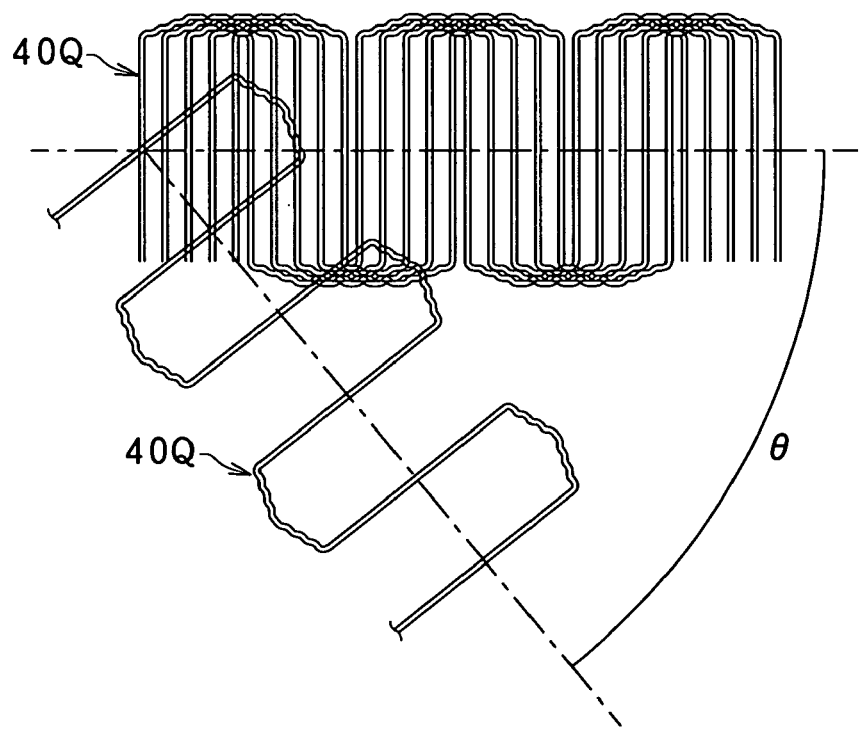
FIG. 21 is a view which illustrates an operation of a weaving step that is one of the steps in FIG. 16.
Figure 22:
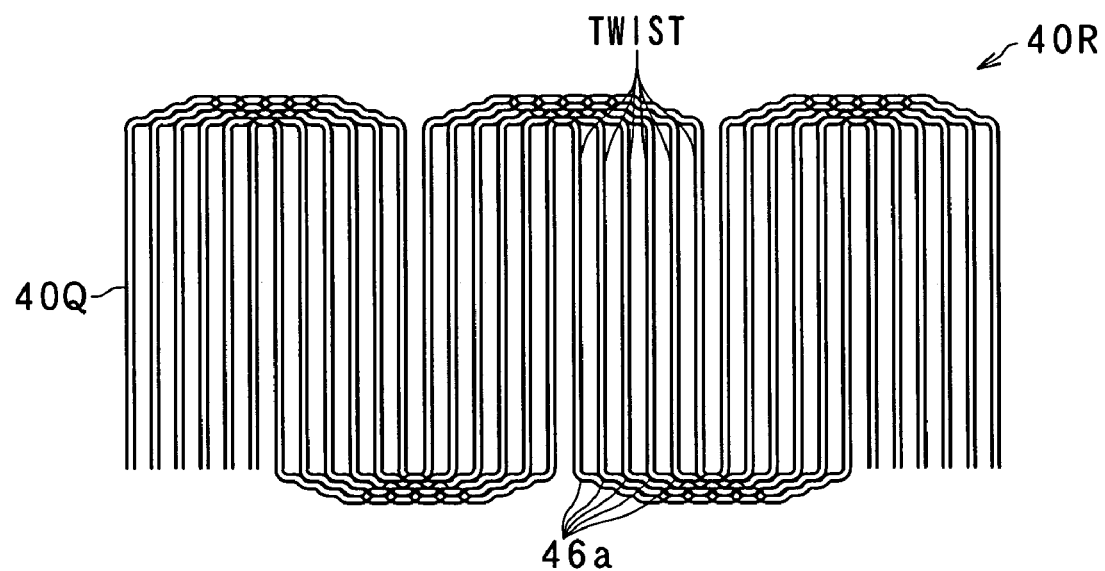
FIG. 22 is a plane view which illustrates the state of a coil after completion of the weaving step of FIG. 21.
Figure 23:
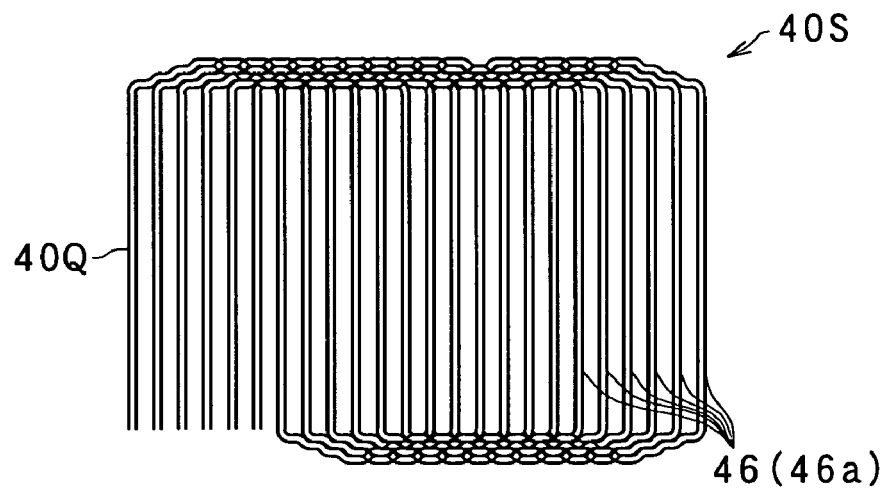
FIG. 23 is a plane view which illustrates the state of a coil after completion of the folding step of FIG. 22.

The production method of the coil 4 includes, as shown in FIG. 16, a sequence of a first bending step S1, a twisting step S2, a second bending step S3, a stepwise coil end forming step S4, a weaving step S5, a folding step S6, and a rolling step S7. FIG. 17 illustrates an operation of the first bending step S1. FIG. 18 illustrates an operation of the twisting step S2. FIG. 19 illustrates an operation of the second bending step S3. FIG. 20 illustrates an operation of the stepwise coil end forming step S4. FIG. 21 illustrates an operation of the weaving step S5. FIG. 22 illustrates the state of the coil 4 after completion of the weaving step S5. FIG. 23 illustrates the state of the coil 4 after completion of the folding step S6.

First, in the first bending step S1, a linear wire 40P is prepared for making the winding 40. The linear wire 40P is bent in one plane several times (six times in this embodiment) from one end thereof to an end 46b of a coil bend-forming portion 46a using bending jigs T1 to make the linear in-slot portions 43 and the linear turned portions 44 alternately which extend perpendicular to the in-slot portions 43. The coil bend-forming portion 46a will finally be the coil bend 46 of the winding 40.

In the twisting step S2, as illustrated in FIG. 18, a portion of the linear wire 40P near the end 46b of the coil bend-forming portion 46a which will finally be, as illustrated in FIG. 10, the coil bend 46 of the in-slot portion 43 is held by a jig T2. Simultaneously, another portion of the linear wire 40P near the end 46c of the coil bend-forming portion 46a is held by a jig T3 and then rotated 180° around the axis of the coil bend-forming portion 46a to turn or twist the coil bend-forming portion 46a.

In the second bending step S3, as illustrated in FIG. 19, the linear wire 40P is bent, like in the first bending step S1, in the plane several times from the end 46c of the coil bend-forming portion 46a using the bending jigs T1 to the other end of the wire 40P to make the linear in-slot portions 43 and the linear turned portions 44 alternately which extend perpendicular to the in-slot portions 43.

After the second bending step S3, the stepwise coil end forming step S4 is, as illustrated in FIG. 20, performed to make the coil ends of the coil 4. Specifically, each of the linear turned portions 44 of the wire 40P is bent stepwise by a press die T4 to make a stepwise coil end.

A total of the six linear wires 40P are shaped in the manner (i.e., steps S1 to S4), as described above, to make six coil wires 40Q.

In weaving step S5, the six coil wires 40Q are prepared, as illustrated in FIG. 21. One of the coil wires 40Q (which will be referred to as a first coil wire 40Q below) is arrayed the illustrated manner. An end (i.e., the in-slot portion 43) of the first coil wire 40Q is, as can be seen in the drawing, intersected with an end of one of the other coil wires 40Q (which will be referred to as a second coil wire 40Q below). The other ends of the first coil wire 40Q and the five coil wires 40Q are held at an angle θ which a longitudinal center line (i.e., an as of the first coil wire 40Q), as indicated by a broken line, traversing the centers of the in-slot portions 43 of the first coil wire 40Q makes with that traversing the centers of the in-slot portions 43 of the second coil wire 40Q. The angle θ will also be referred to as a weaving angle below and is preselected to be within a given range. The first coil wire 40Q and the second coil wire 40Q are rotated around the respective longitudinal center lines in the same direction. This causes the turned portions 44 of the first and second coil wires 40Q to cross several times from one end to the other end of the turned portions 44 (see FIGS. 2, 7, and 14). The remaining coil wires 40Q are weaved in the same manner as described above to make a weaved wire bundle 40R of the six coil wires 40Q, as illustrated in FIG. 22.

Subsequently, the weaved wire bundle 40R is subjected to the operation of the folding step S6. Specifically, the six coil wires 40Q are bent 180°, that is, folded in half at the coil bend-forming portions 46a, as illustrated in FIG. 22. In other words, the right half of the weaved wire bundle 40R, as illustrated in FIG. 22, is folded over the left half thereof. The coil bend-forming portions 46a about which the weaved wire bundle 40R is folded have been twisted 180° in the twisting step S2. Such twisting is eliminated by folding the weaved wire bundle 40R in the folding step S6. In this way, both sides of the weaved wire bundle 40R are laid to overlap each other without deforming the coil wires 40Q undesirably. Ater the folding step S6, the weaved wire bundle 40R is shaped, as illustrated in FIG. 23, just like a total of the twelve coil wires 40Q are weaved. This assembly will be referred to as a weaved coil assembly 40S below.

Finally, in the rolling step S7, the weaved coil assembly 40S is rolled into a circle as a whole to make the coil 4, as illustrated in FIG. 7.

As apparent from the above discussion, the production method of the coil 4 includes the first and second bending steps S1 and S3 in which the linear wires 40P are bent into a rectangular wave shape to form the in-slot portions 43 and the coil bends 46, the twisting step S2 in which the coil bend-forming portions 46a are twisted 180 about the axis thereof, the stepwise coil end forming step S4 in which each of the linear turned portions 44 of the wire 40P are bent stepwise to make the stepwise coil ends, the weaving step S5 in which the coil wires 40Q are so weaved as to cross the turned portions 44 to make the weaved wire bundle 40R, the folding step S6 in which the weaved wire bundle 40R is substantially folded in half about the coil bend-forming portion 46a to make the weaved coil assembly 40S, and the rolling step S7 in which the weaved coil assembly 40S is rolled into a donut shape. This ensures the accuracy in forming the coil 4 into a desired shape which is made up of the phase-windings 40 which include the in-slot portions 43 to be disposed in the slots 31 arrayed in the circumferential direction of the stator core 30, the turned portions 44 connecting the in-slot portions 43 outside the slots 31, and the coil bends 46, as defined by some of the in-slot portions 43 lying at the middle of the windings 40 where the winding direction of the coil 4 is reversed.

The bending of the linear wires 40P includes the first bending step S1 in which a half of the wire 40P on the left side of the coil bend-forming portion 46a, as viewed in FIGS. 17 to 19, is bend several times at right angles and the second bending step S3 in which a remaining half of the wire 40P is bend. The twisting step S2 is performed between steps S1 and S3, thus facilitating the ease of twisting the coil bend-forming portion 46a.

Before the folding step S6, the stepwise coil end forming step S4 is performed to make the stepwise coil ends of the coil 4. Specifically, each of the turned portions 44 of the wire 40P is bent stepwise, which enhances the tight crossing of the turned portions 44 of the coil wires 40Q, thus minimizing the protrusion of the coil ends from the axial ends of the stator core 30. The execution of the stepwise coil end forming step S4 before the folding step S6 facilitates the ease of forming the turned portions 44 stepwise without any physical interference of the coil wires 40P.

Figure 24:
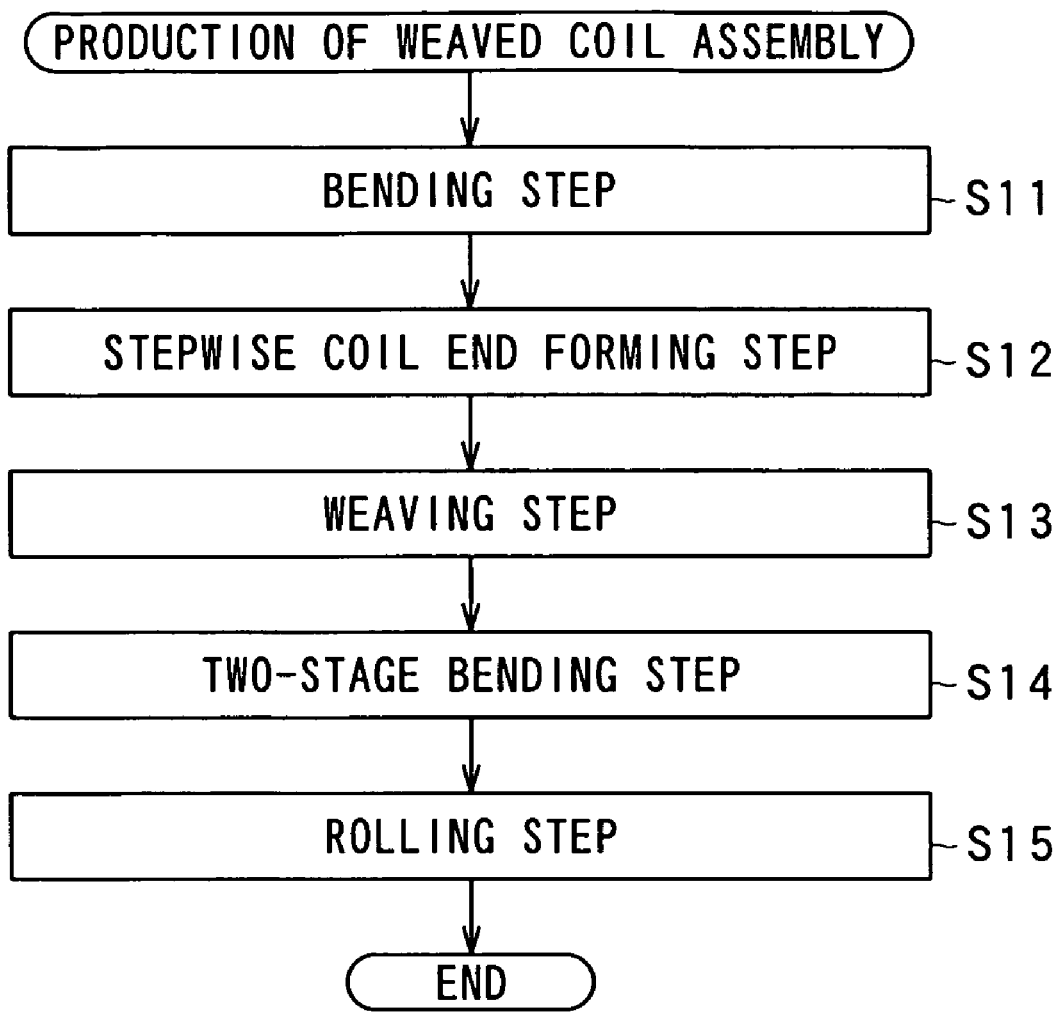
FIG. 24 is a flowchart of a sequence of steps of making a coil according to the second embodiment of the invention.

The production method of the coil 4 according to the second embodiment of the invention will be described below with reference to FIGS. 24 to 29(b). FIG. 24 is a flowchart of a sequence of steps to make the coil 4 in the second embodiment.

Figure 25:
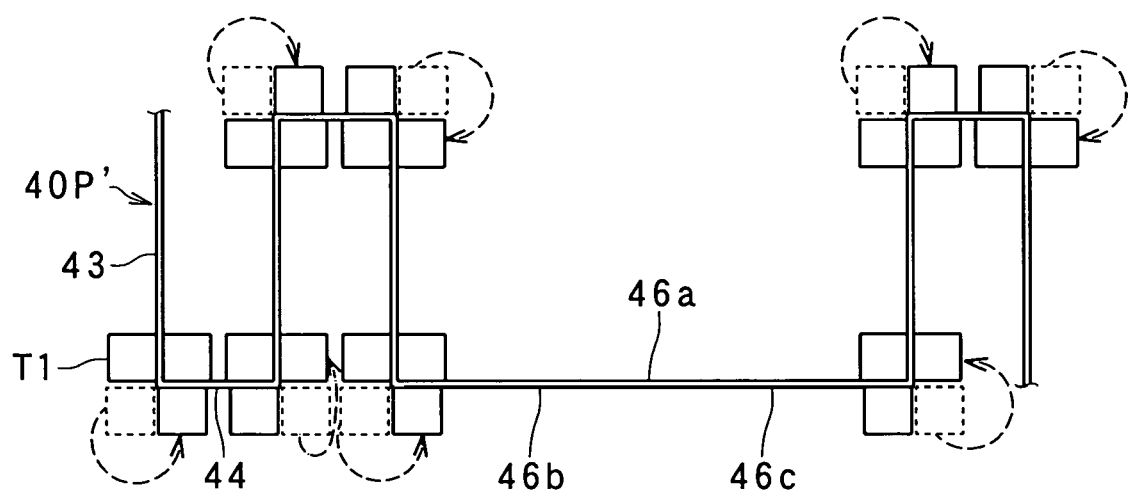
FIG. 25 is a view which illustrates an operation of a bending step that is one of the steps in FIG. 24.
Figure 26:
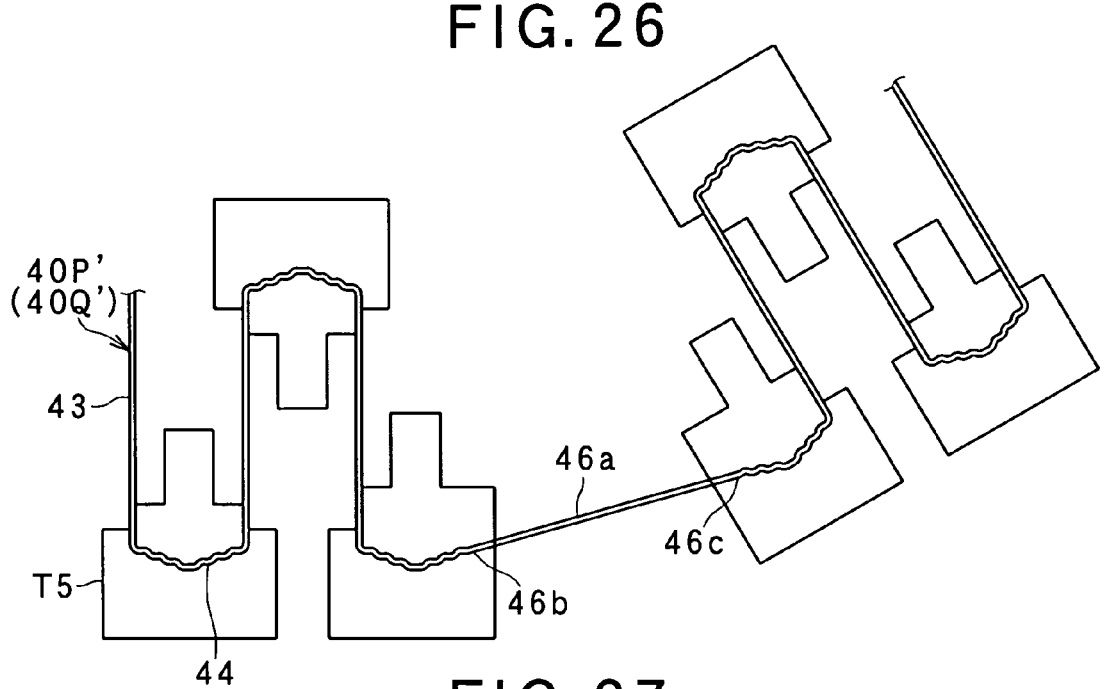
FIG. 26 is a view which illustrates an operation of a stepwise coil end forming step that is one of the steps in FIG. 24.
Figure 27:
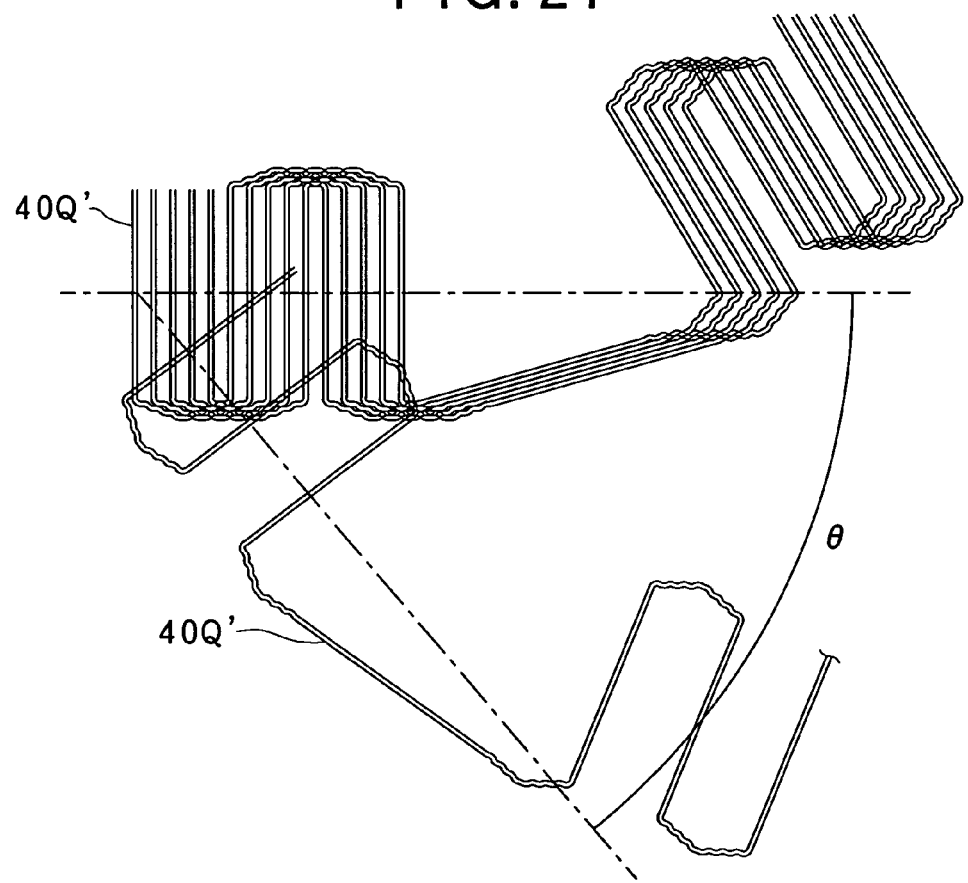
FIG. 27 is a view which illustrates an operation of a weaving step that is one of the steps in FIG. 24.
Figure 28:
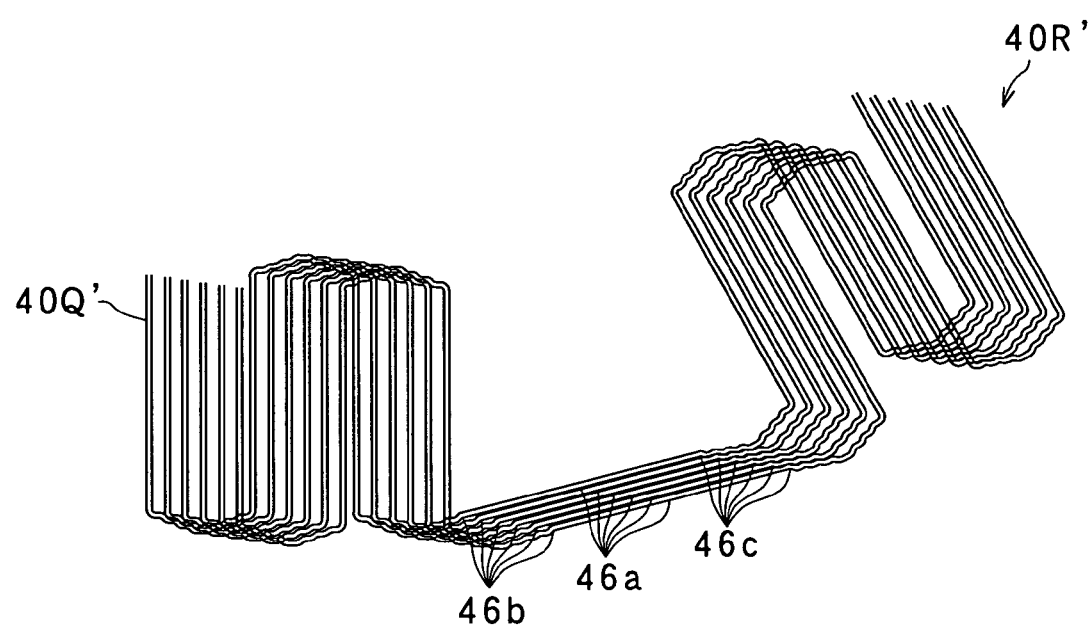
FIG. 28 is a view which illustrates a weaved wire bundle made up of six coil wires produced by the weaving step in FIG. 27.
Figure 29A:
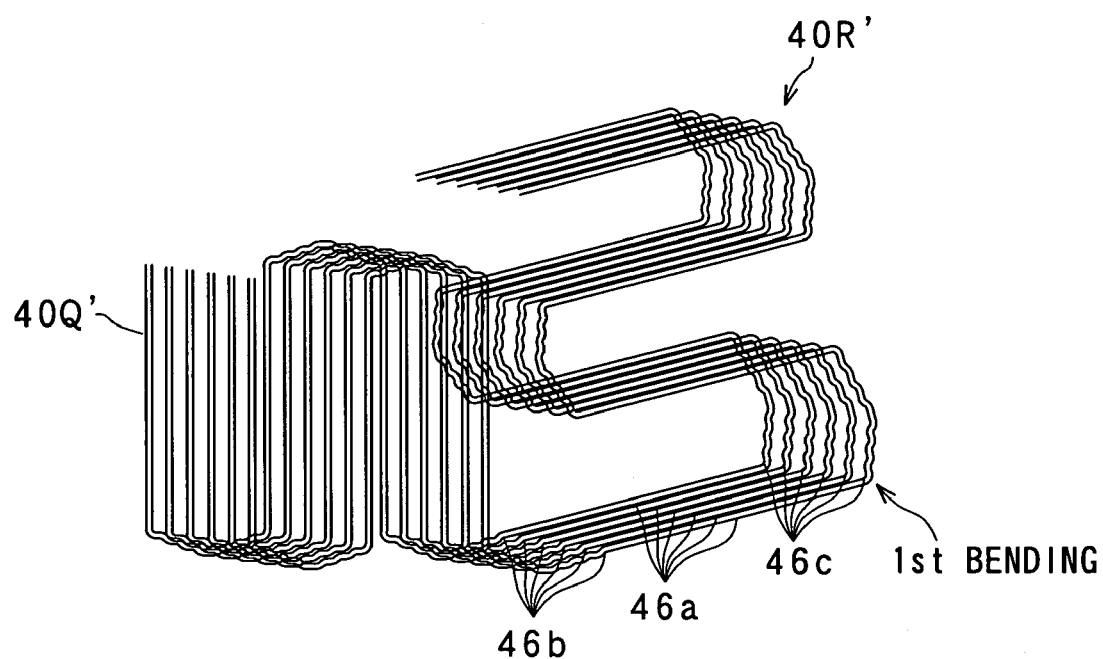
FIGS. 29(a) and 29(b) are views which illustrate operations of a two-stage bending step that is one of the steps in FIG. 24.
Figure 29B:
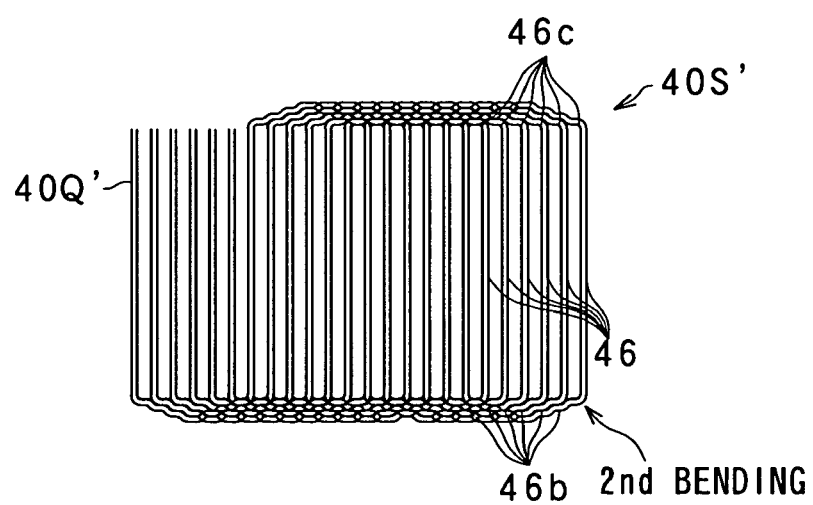

The production method of the coil 4 includes, as shown in FIG. 24, a sequence of a bending step S11, a stepwise coil end forming step S12, a weaving step S13, a two-stage bending step S14, and a rolling step S15. FIG. 25 illustrates an operation of the bending step S11. FIG. 26 illustrates an operation of the stepwise coil end forming step S12. FIG. 27 illustrates an operation of the weaving step S13. FIG. 28 illustrates a weaved wire bundle 40R' made up of six coil wires 40Q'. Note that the coil wires 40Q' before being weaved are illustrated in FIG. 28 for the sake of brevity of illustration. FIG. 29(a) illustrates the weaved wire bundle 40R' in which the ends 46c of coil bend-forming portions 46c are bent 90° in a counterclockwise direction in one plane. Note that the coil wires 40Q' before being weaved are illustrated in FIG. 29(a) for the sake of brevity of illustration. FIG. 29(b) illustrates a weaved coil assembly 40S' in which the ends 46b are folded 90° in the counterclockwise direction.

First, in the bending step S11 a linear wire 40P' is prepared for making the winding 40. The linear wire 40P' is bent at right angles from one end to the other end thereof several times in one plane using the bending jig T1 to make the linear in-slot portions 43 and the linear turned portions 44 alternately which extend perpendicular to the in-slot portions 43. The ends 46b and 46c of the coil bend-forming portion 46a are not bend at right angles.

In the stepwise coil end forming step S12, as illustrated in FIG. 26, each of the linear turned portions 44 of the wire 40P' is bent stepwise by press dies T5 to make a stepwise coil end.

In weaving step S13, the six coil wires 40Q' are prepared, as illustrated in FIG. 27. One of the coil wires 40Q' (which will be referred to as a first coil wire 40Q' below) is arrayed in the illustrated manner. An end (i.e., the in-slot portion 43) of the first coil wire 40Q' is, as can be seen in the drawing, intersected with an end of one of the other five coil wires 40Q' (which will be referred to as a second coil wire 40Q' below). The other ends of the first coil wire 40Q' and the five coil wires 40Q' are held at the weaving angle θ which a longitudinal center line (i.e., an axis of the first coil wire 40Q') passing through the centers of the in-slot portions 43 of the first coil wire 40Q' makes with that passing through the centers of the in-slot portions 43 of the second coil wire 40Q'. The angle θ, as indicated in FIG. 27, represents the one in FIG. 21. The weaving angle θ in this embodiment is, therefore, smaller than that in the first embodiment. The first coil wire 40Q' and the second coil wire 40Q' are rotated around the respective longitudinal center lines in the same direction. This causes the turned portions 44 of the first and second coil wires 40Q' to cross several times from one end to the other end of the turned portions 44. The remaining coil wires 40Q' are weaved in the same manner as described above to make the weaved wire bundle 40R' of the six coil wires 40Q, as illustrated in FIG. 28.

The weaved wire bundle 40R' is subjected to the operation of the two-stage bending step S14. Specifically, the ends 46c of the coil bend-forming portions 46a of the six coil wires 40Q are, as illustrated in FIG. 29(a), bent 90° in one plane in the counterclockwise direction toward the adjacent in-slot portions 43. Subsequently, the ends 46b of the coil bend-forming portions 46a of the six coil wires 40Q' are, as illustrated in FIG. 29(b), bent 90° in one plane in the counterclockwise direction to make the weaved coil assembly 40S' which is shaped just like a total of the twelve coil wires 40Q are weaved.

Finally, in the rolling step S15, the weaved coil assembly 40S' is rolled into a circle as a whole to make the coil 4, as illustrated in FIG. 7.

As apparent from the above discussion, the production method of the second embodiment includes the bending step S11 in which the linear wires 40P are bent into a rectangular wave shape to form the in-slot portions 43 and the coil bends 46 except the ends 46b and 46c of the coil bend-forming portions 46a, the stepwise coil end forming step S12 in which the linear turned portions 44 of the wire 40P are bent stepwise to make the stepwise coil ends, the weaving step S13 in which the coil wires 40Q' are so weaved as to cross the turned portions 44 to make the weaved wire bundle 40R', and the two-stage bending step S14 in which the coil wires 40Q' are bent at right angles at the ends 46b and 46c of the coil bend-forming portions 46a to make the weaved coil assembly 40S' in which weaved portions of the coil wires 40R' on both sides of the coil bend-forming portion 46a are laid to overlap each other. The production method of this embodiment, like in the first embodiment, ensures the accuracy in forming the coil 4 into a desired shape.

Figure 30:
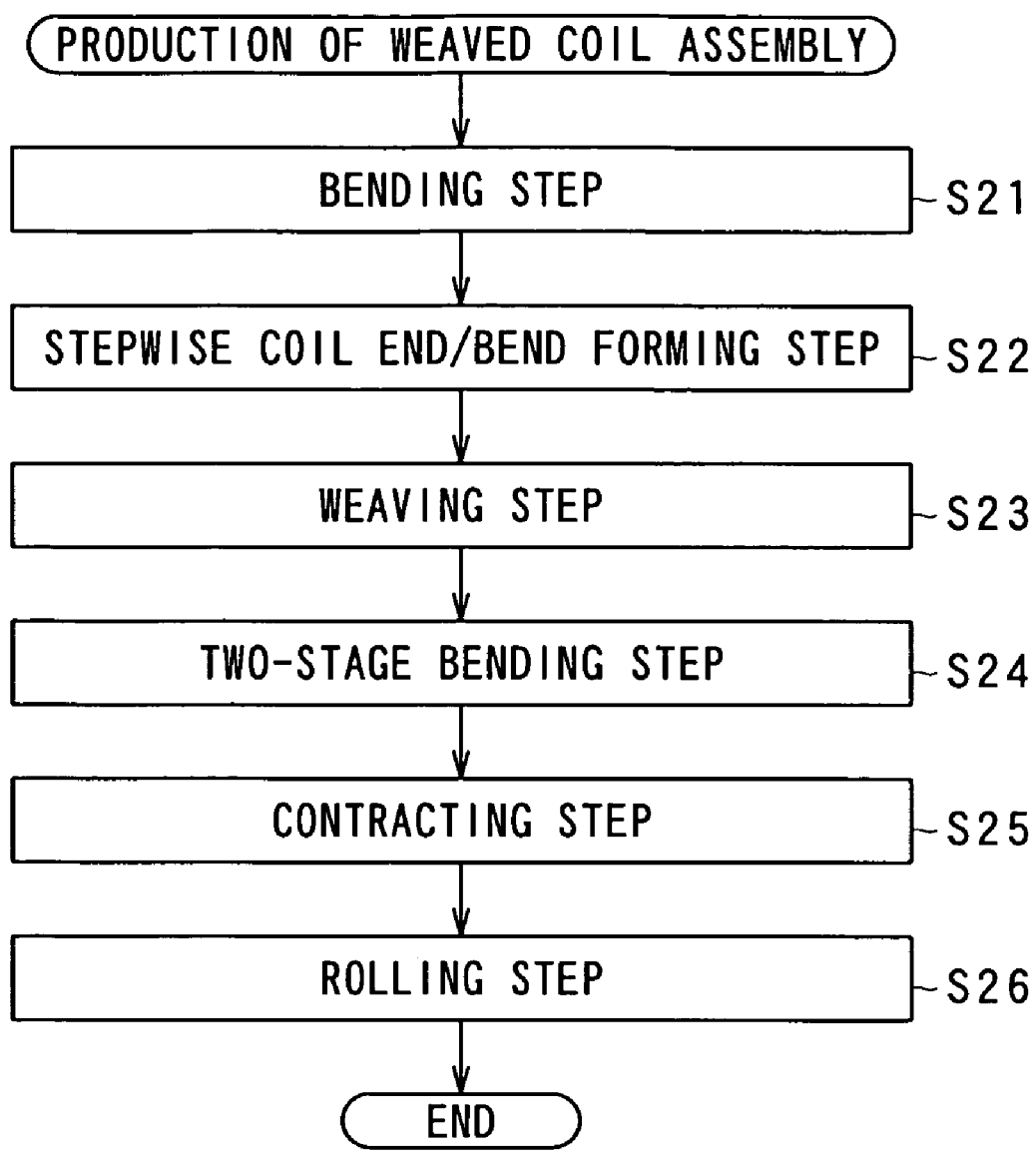
FIG. 30 is a flowchart of a sequence of steps of making a coil according to the third embodiment of the invention.

A method of producing the coil 4 in the third embodiment will be described below with reference to FIGS. 30 to 36. FIG. 30 is a flowchart of a sequence of steps to make the coil 4.

Figure 31:
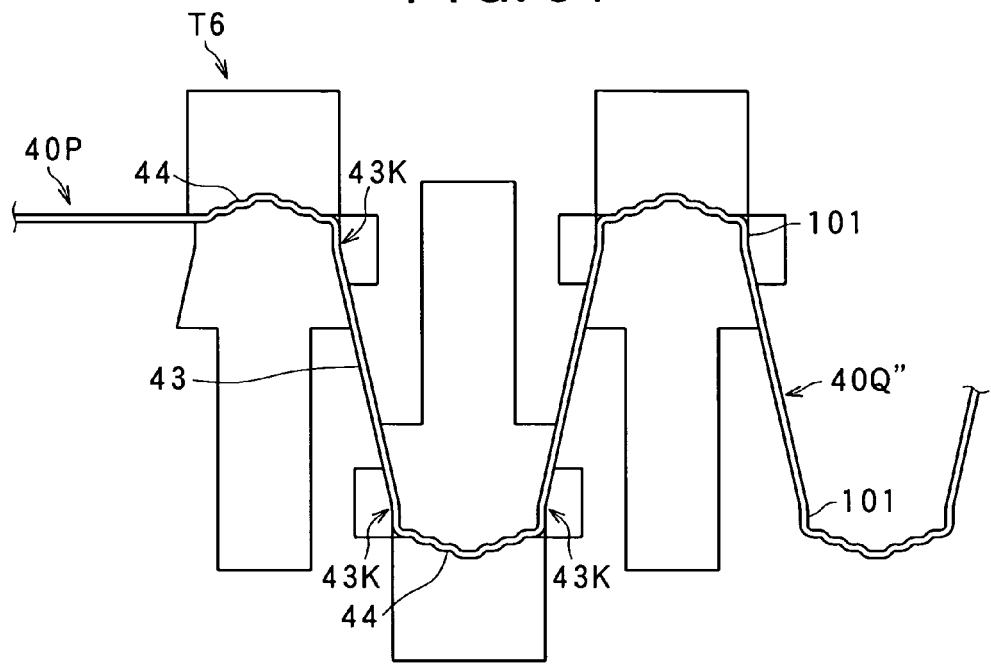
FIG. 31 is a view which illustrates an operation of a stepwise coil end/bend forming step that is one of the steps in FIG. 30.
Figure 32:
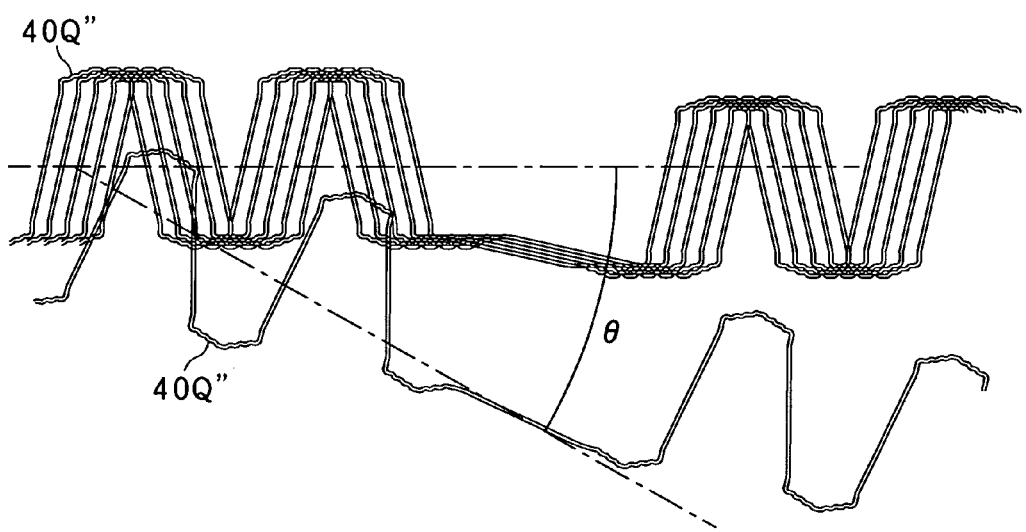
FIG. 32 is a view which illustrates an operation of a weaving step that is one of the steps in FIG. 30.
Figure 33:
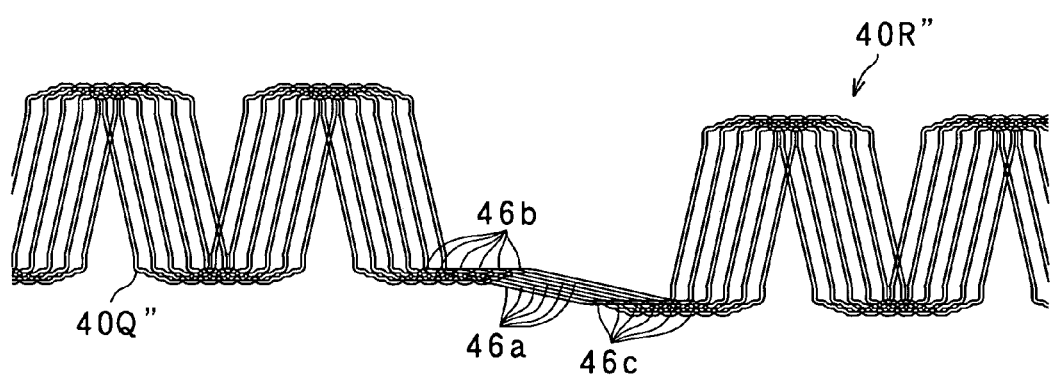
FIG. 33 illustrates a weaved wire bundle made up of six coil wires produced by the weaving step of FIG. 32.
Figure 34A:
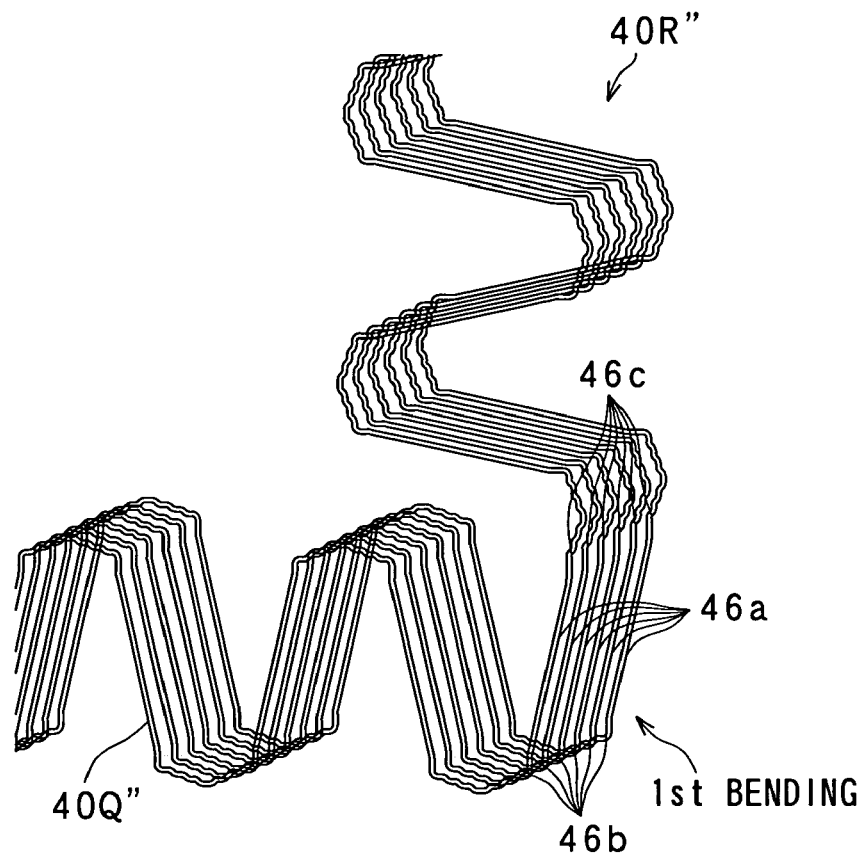
FIGS. 34(a) and 34(b) are views which illustrate operations of a two-stage bending step that is one of the steps in FIG. 30.
Figure 34B:
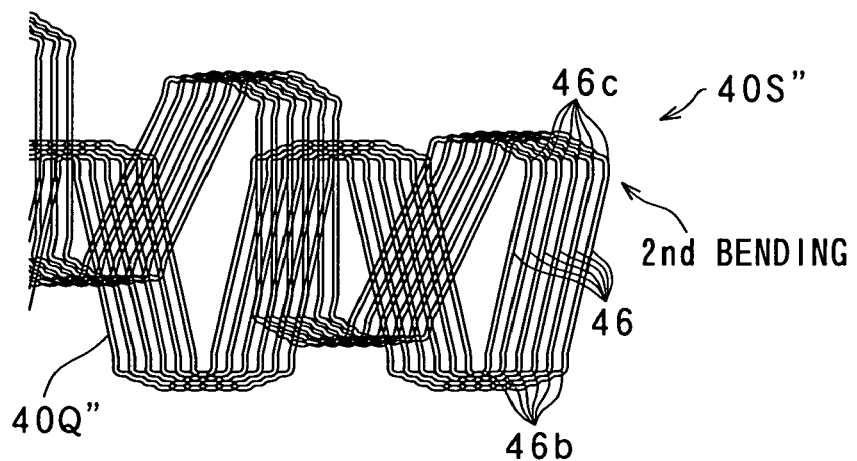

The production method of the coil 4 includes, as shown in FIG. 30, a sequence of a bending step S21, a stepwise coil end/bend forming step S22, a weaving step S23, a two-stage bending step S24, a contracting step S25, and a rolling step S26. FIG. 31 illustrates an operation of the stepwise coil end/bend forming step S22, FIG. 32 illustrates an operation of the weaving step S23. FIG. 33 illustrates a weaved wire bundle 40R'' made up of six coil wires 40Q''. Note that the coil wires 40Q'' before being weaved are illustrated in FIG. 33 for the sake of brevity of illustration. FIGS. 34(a) and 34(b) illustrate operations of the bending step S24. Note that the coil wires 40Q'' before being weaved are illustrated in FIGS. 34(a) and 34(b) for the sake of brevity of illustration.

First, the bending step S21 is performed to bend the linear wire 40P in the same manner, as that in step S11 of the first embodiment.

In the stepwise coil end/bend forming step S22, the turned portions 44 of the linear wire 40P are bent using press dies T6 to make stepwise coil ends. Simultaneously, each of the turned portions 44 is shaped to have bends 43K at both ends thereof.

The bends 43K are so shaped as to increase an interval between adjacent two of the in-slot portions 43 with distance from the turned portion 44 therebetween. In other words, the bends 43K are so shaped as to have a greater distance between ends of the adjacent in-slot portions 43 which are farther from the turned portion 44 lying between the adjacent in-slot portions 43 than that between the bends 43K closer to that turned portion 44.

The angle of the bend 43K at one of the ends of each of the in-slot portions 43 is identical with that at the other end of the in-slot portion 43. This causes straight sections 101 which extend at the ends of each of the in-slot portions 43 and lie outside the bends 43K to be oriented substantially parallel to each other, thereby keeping the longitudinal center line passing through the centers of the in-slot portions 43 straight. The length of each of the in-slot portions 43 is longer than the distance between adjacent two of the in-slot portions 43. Each of the odd turned portions 44 is 180° out of phase with an adjacent-one of the even turned portions 44 around the longitudinal center line.

Subsequently, in the weaving step S23, as illustrated in FIG. 32, the six coil wires 40Q", as produced in the stepwise coil end/bend forming step S22, are prepared as illustrated in FIG. 32. One of the coil wires 40Q" (which will be referred to as a first coil wire 40Q" below) is arrayed in the illustrated manner. An end (i.e., the in-slot portion 43) of the first coil wire 40Q" is, as can be seen in the drawing, intersected with an end of one of the other five coil wires 40Q" (which will be referred to as a second coil wire 40Q" below). The other ends of the first coil wire 40Q" and the five coil wires 40Q" are held at the weaving angle θ which a longitudinal center line (i.e., an axis of the first coil wire 40Q") passing through the centers of the in-slot portions 43 of the first coil wire 40Q" makes with that passing through the centers of the in-slot portions 43 of the second coil wire 40Q". The weaving angle θ is approximately 25° in this embodiment. The angle θ, as indicated in FIG. 32, represents the one in FIG. 21. The weaving angle θ in this embodiment is smaller than that in the first embodiment. The first coil wire 40Q" and the second coil wire 40Q" are rotated around the respective longitudinal center lines in the same direction. This causes the turned portions 44 of the first and second coil wires 40Q" to cross several times from one end to the other end of the turned portions 44. The remaining coil wires 40Q" are weaved in the same manner as described above to make a weaved wire bundle 40R" of the six coil wires 40Q", as illustrated in FIG. 33

The weaved wire bundle 40R" is subjected to the operation of the two-stage bending step S24. Specifically, the ends 46b of the coil bend-forming portions 46a of the six coil wires 40Q" are, as illustrated in FIG. 34(a), bent 90° in one plane in the counterclockwise direction toward the adjacent in-slot portions 43. Subsequently, the ends 46c of the coil bend-forming portions 46a of the six coil wires 40Q" are, as illustrated in FIG. 34(b), bent 90° in one plane in the counterclockwise direction to make the weaved coil assembly 40S" which is shaped just like a total of the twelve coil wires 40Q" are weaved.

Figure 36:
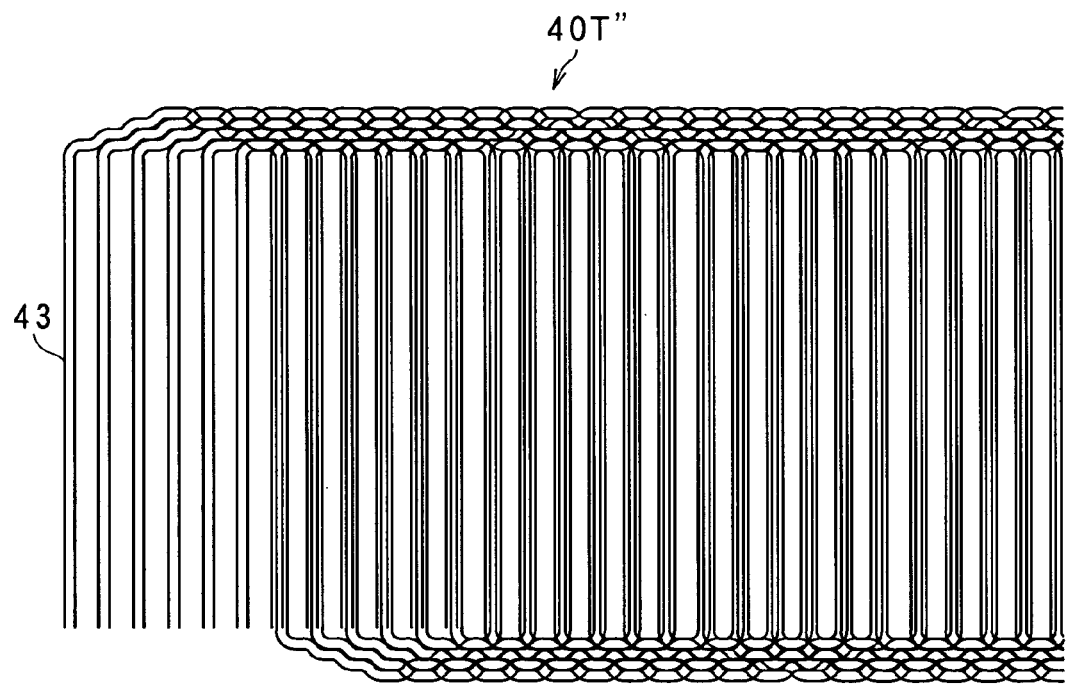
FIG. 36 is a view which shows a weaved coil assembly made by the contracting step of FIG. 35.

In the contracting step S25, as illustrated in FIG. 35, the bends 43K at the ends of the in-slot portions 43 of the weaved coil assembly 40S", as produced in the two-stage bending step S24, are clamped by coil holders CH1 and CH2. The coil holder CH1 is actuated to flatten or straighten the bends 43K. The first group that is a leftmost one of groups of the turned portions 44 of the weaved coil assembly 40Q" is fixed. The actuation of the coil holders CH1 and CH2 to straighten the bends 43K will cause adjacent two of the in-slot portions 43 to move close to each other. This cause the group A of the turned portions 44, the group B of the turned portions 44, the group C of the turned portions 44 which are the second, the third, and the fourth to the left group are, therefore, moved simultaneously to the left, as viewed in the drawing. If the amount by which the second group A is moved is defined as one (1), the third and fourth groups B and C will be moved by two (2) and three (3). This makes the weaved coil assembly 40T, as illustrated in FIG. 36, which has the in-slot portions 43 extending substantially parallel to each other.

Finally, in the rolling step S26, the weaved coil assembly 40T" is rolled into a circle as a whole to make the coil 4, as illustrated in FIG. 7.

As apparent from the above discussion, the production method of the coil 4 of this embodiment includes the stepwise coil end/bend forming step S22 in which each of the in-slot portions 43 of the coil wire 40P is shaped to have formed at the ends thereof the bends 43K which spreads adjacent two of the in-slot portions 43 with increasing distance from one of the turned portions 44 between the adjacent two, the weaving step S23 in which the ends of any two of the coil wires 40Q" is intersected with each other, the other ends of the two are held so as to have the angle θ between the longitudinal center lines thereof which is within a given range, and at least one of the other ends of the two is rotated to twist the two adjacent stepwise turned portions 44, and the contracting step S25 in which the bends 43K of the in-slot portions 43 of the weaved coil assembly 40S" are pressed to be straightened to orient the in-slot portions 43 parallel to each other.

The formation of the bends 43K which spread adjacent two of the in-slot portions 43 with increasing distance from one of the turned portions 44 between the adjacent two facilitates the ease of weaving the turned portions 44 without any physical interference between the turned portions 44. Particularly, when a lot of the coil wires 40Q" are used to make the weaved coil assembly 40S", the space between the turned portions 44 of any adjacent two of the coil wires 40Q" will be small. The above advantage will be great in such a case. The angle θ between the longitudinal center lines of the coil wires 40Q" may, therefore, be decreased to minimize the deformation of the coil wires 40Q" when being weaved.

The above advantage also permits a small-sized rotary machine to be used in the weaving step S23, thus resulting in a decrease in production cost of the coil 4 and the rotating motion of the coil wires 40Q" to be decreased, thus facilitating the rotation of the coil wires 40Q" at high speeds to decrease the time required to weave the coil wires 40Q".

Particularly, each of the coil wires 40Q" is designed to have a spread angle α between adjacent two of the in-slot portions 43 which is smaller than the weaving angle θ when the bends 43K are formed at the ends of each of the in-slot portions 43 in the stepwise coil end/bend forming step S22. The increasing of the spread angle α will permits the weaving angle θ to be decreased, thus resulting in a decrease in deformation of the coil wires 40Q" when being weaved.

Figure 37:
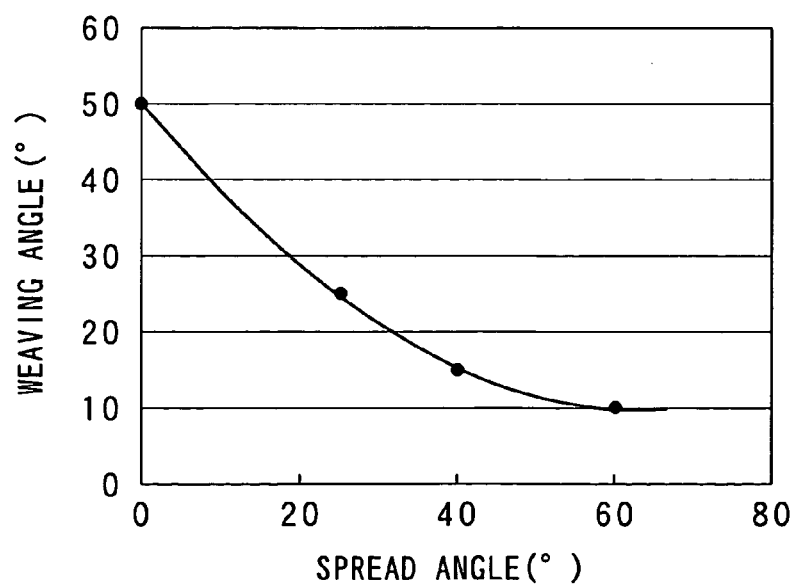
FIG. 37 is a graph which represents an experimentally acquired relation between a spread angle and a weaving angle of coil wires which eliminates the physical interference between turned portions in the weaving step of FIG. 32.
Figure 38:
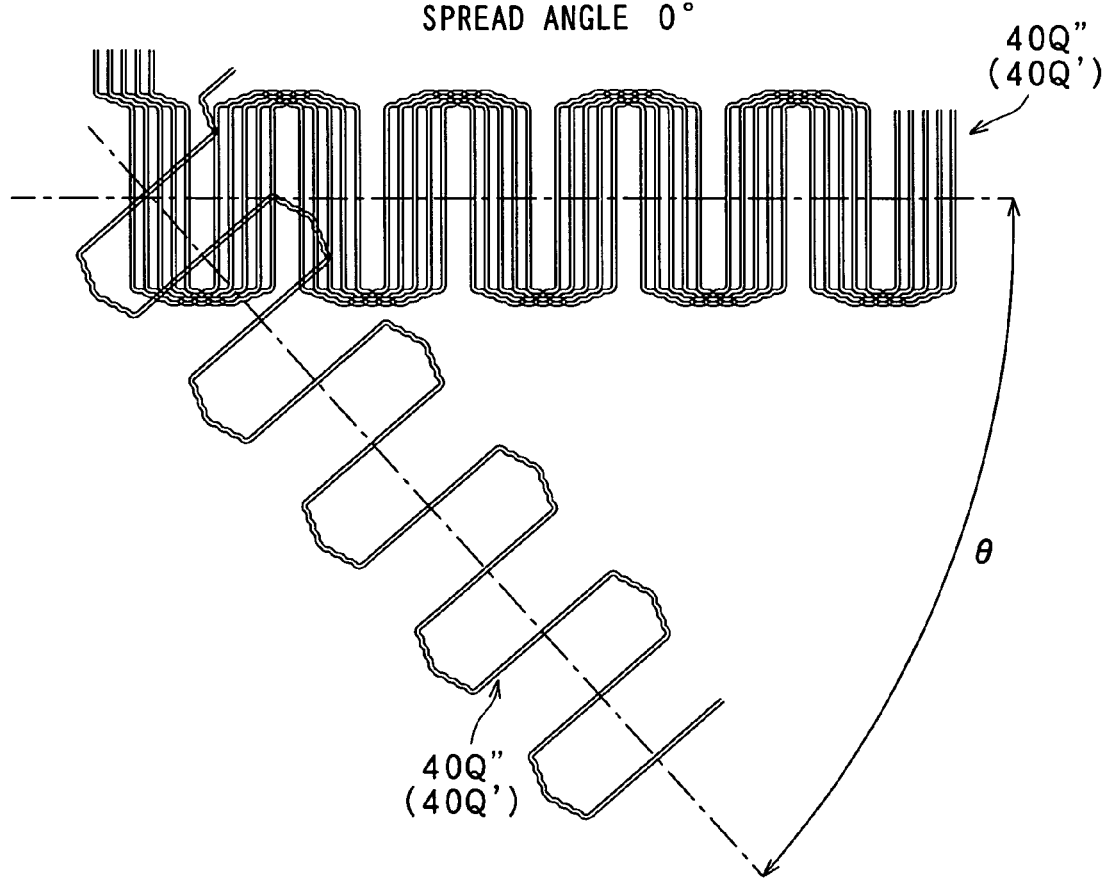
FIG. 38 is a view which demonstrates a case where a spread angle α is 0°, and a weaving angle θ is 50°.
Figure 39:
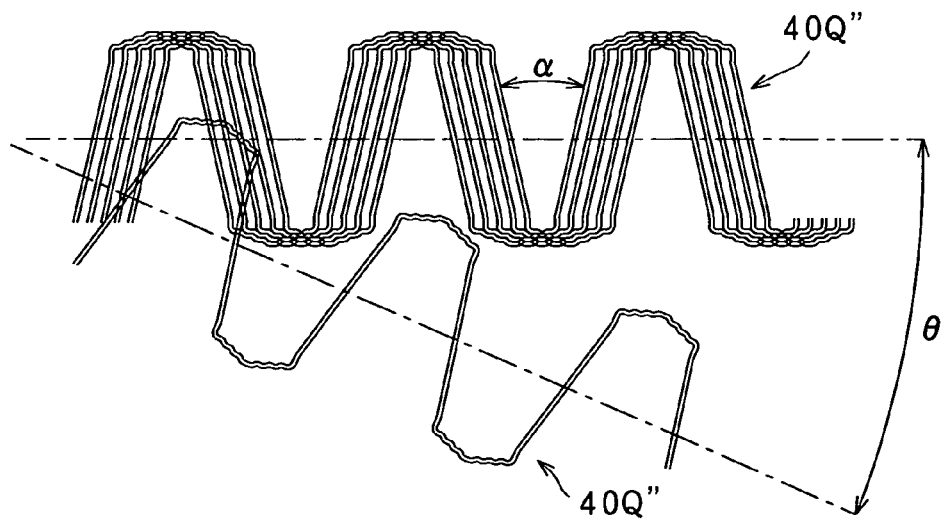
FIG. 39 is a view which demonstrates a case where a spread angle α is 25°, and a weaving angle θ is 25°.
Figure 40:
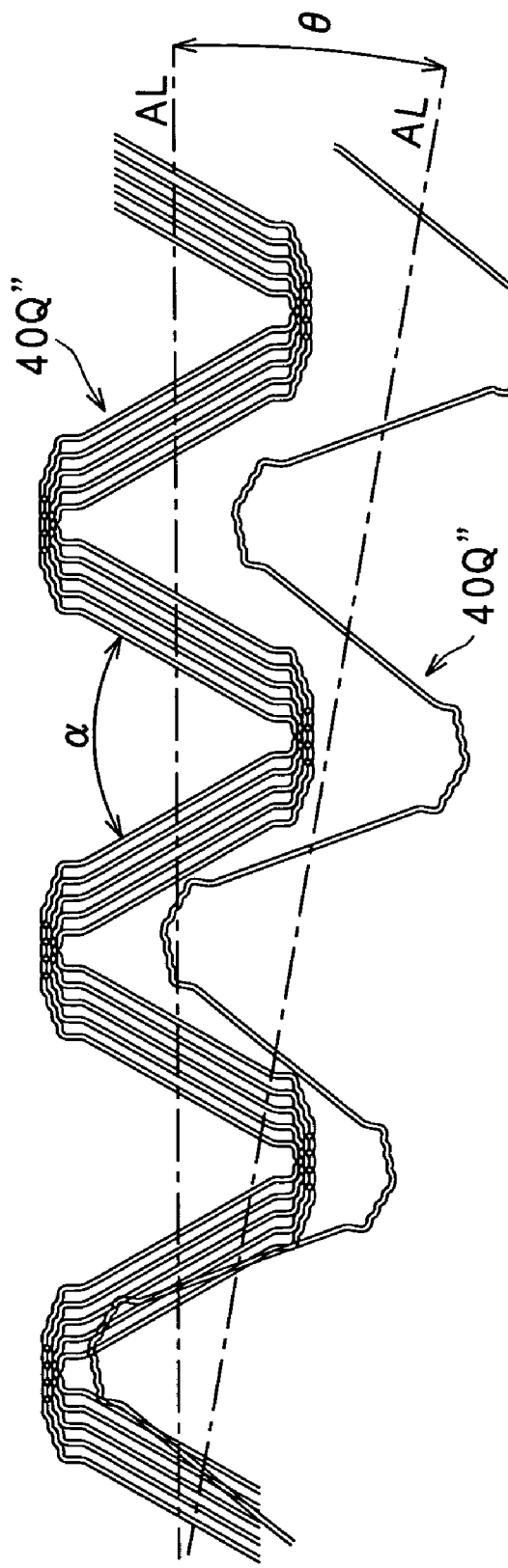
FIG. 40 is a view which demonstrates a case where a spread angle α is 60° and a weaving angle θ is 10°.

FIG. 37 is a graph which represents an experimentally acquired relation between the spread angle α and the weaving angle θ of the coil wires 40Q" which eliminates the physical interference between the turned portions 44 in the weaving step S23. Specifically, when the spread angle α is zero (0), that is, when the coil wires 40Q' of the second embodiment, as illustrated in FIG. 38, has the in-slot portions 43 extending parallel to each other, the weaving angle θ needed to eliminate the physical interference between the turned portions 44 is 50°. When the spread angle α is 25°, as illustrated in FIG. 39, the weaving angle θ needed to eliminate the physical interference between the turned portions 44 is 25°. When the spread angle α is 40° identical with that in the third embodiment of FIG. 32, the weaving angle θ needed to eliminate the physical interference between the turned portions 44 is 15°. When the spread angle α is 60°, as illustrated in FIG. 40, the weaving angle θ needed to eliminate the physical interference between the turned portions 44 is 10°. The graph shows that the increasing of the spread angle α enables the weaving angle θ to be decreased. The inventors have found that a ratio of the weaving angle θ to the spread angle α is preferably less than or equal to one (1).

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set for in the appended claims.

For instance, the production method of the coil 4 in the first embodiment has the twisting step S2 performed between the first and second bending steps S1 and S3, but however, the twisting step S2 may be made before the first bending step S1 to perform the first and second bending steps S1 and S3 continuously.

The production method of the coil 4 in the third embodiment forms the stepwise turned portions 44 and the bends 43K simultaneously in the stepwise coil end/bend forming step S22, but however, they may alternatively be made in separate steps.

What is claimed is:

1. A method of producing a coil for use in an electric rotary machine, the coil being to be wound in a stator core in which a plurality of slots are arrayed in a circumferential direction of the stator core, the coil including a plurality of phase-windings each of which is waved in the circumferential direction and has a length made up of in-slot portions, turned portions, and a coil bend defined by one of the in-slot portions, each of the in-slot portions being to be disposed in one of the slots, each of the turned portions connecting between adjacent two of the in-slot portions outside the stator core, each of the phase-windings being folded at the coil bend so as to reverse a direction in which the phase winding is wound in the stator core, the method comprising the steps of:
    bending each of straight coil wires into a rectangular wave shape including the in-slot portions and the turned portions;
    turning a coil bend-forming portion that is one of the in-slot portions of each of the coil wires which becomes the coil bend of the phase winding by 180° around an axis of the one of the in-slot portions;
    twisting the turned portions of one of the coil wires and the turned portions of another of the coil wires together to weave the coil wires into a wire bundle; and
    folding said wire bundle at the coil bend-forming portions of the coil wires to place sides of the wire bundle to overlap each other to make the coil.

2. A method as set forth in claim 1, wherein each of the coil wires has a length made up of a first portion, a second portion, and the coil bend-forming portion between the first and second portions, and wherein said bending step includes a first bending step to bend the first portion into the rectangular wave shape and a second bending step to bend the second portion into the rectangular shape, and wherein said turning step is performed between the first and second bending step.

3. A method as set forth in claim 1, further comprising a stepwise coil end forming step which is performed before said folding step to form the turned portions into a stepwise shape.

4. A method of producing a coil for use in an electric rotary machine, the coil being to be wound in a stator core in which a plurality of slots are arrayed in a circumferential direction of the stator core, the coil including a plurality of phase-windings each of which is waved in the circumferential direction and has a length made up of in-slot portions, turned portions, and a coil bend defined by one of the in-slot portions) each of the in-slot portions being to be disposed in one of the slots, each of the turned portions connecting between adjacent two of the in-slot portions outside the stator core, each of the phase-windings being folded at the coil bend so as to reverse a direction in which the phase winding is wound in the stator core, the method comprising the steps of:
    bending each of straight coil wires into a rectangular wave shape except end portions of a coil bend-forming portion, the rectangular wave shape including the in-slot portions and the turned portions, one of the in-slot portions being a coil bend-forming portion which becomes the coil bend of one of the phase windings;
    weaving the coil wires, as produced by said bending step, together into a wire bundle; and
    folding said wire bundle at the ends of the coil bend-forming portion of each of the coil wires at right angles toward an adjacent one of the in-slot portions to make the coil.

5. A method as set forth in claim 4, further comprising a bend forming step of forming bends at ends of each of the in-slot portions of each of the coil wire so as to spread adjacent two of the in-slot portions with increasing distance from one of the turned portions between the adjacent two, wherein said weaving step is to intersect an end of a first coil wire that is one of the coil wires with an end of a second coil wire that is another of the coil wires, hold other ends of the first coil and the second coil at an angle which an axis of the first coil wire makes with an axis of the second coil wire and which is within a given range, and to rotate at least one of the first and second coil wires to twist the turned portions of the first and second coil wires together to make the wire bundle, and further comprising a contracting step of straightening the bends of the in-slot portions of the coil wires of the wire bundle to contract the wire bundle so as to move adjacent two of the in-slot portions close to each other.

6. A method as set forth in claim 4, further comprising a stepwise coil end forming step which is performed before said folding step to form the turned portions into a stepwise shape.

* * * * *